United States Patent
Favaretto

(10) Patent No.: US 12,491,763 B2
(45) Date of Patent: Dec. 9, 2025

(54) CAR PROVIDED WITH A HYDROGEN-POWERED INTERNAL COMBUSTION ENGINE

(71) Applicant: FERRARI S.P.A., Modena (IT)

(72) Inventor: Fabrizio Favaretto, Modena (IT)

(73) Assignee: FERRARI S.P.A., Modena (IT)

(*) Notice: Subject to any disclaimer, the term of this patent is extended or adjusted under 35 U.S.C. 154(b) by 281 days.

(21) Appl. No.: 18/454,886

(22) Filed: Aug. 24, 2023

(65) Prior Publication Data

US 2024/0066979 A1    Feb. 29, 2024

(30) Foreign Application Priority Data

Aug. 25, 2022    (IT) .................. 102022000017559

(51) Int. Cl.

| | | |
|---|---|---|
| *B60K 15/07* | (2006.01) | |
| *B60K 13/02* | (2006.01) | |
| *B60K 13/04* | (2006.01) | |
| *B60K 15/03* | (2006.01) | |
| *B60K 15/063* | (2006.01) | |

(52) U.S. Cl.
CPC .............. *B60K 15/07* (2013.01); *B60K 13/02* (2013.01); *B60K 13/04* (2013.01); *B60K 2015/03118* (2013.01); *B60K 2015/03315* (2013.01); *B60K 2015/0638* (2013.01)

(58) Field of Classification Search
CPC .... B60K 15/07; B60K 15/063; B60K 15/073; B60K 15/03006; B60K 2015/03118; B60K 2015/03315; B60K 2015/0638; B60K 13/02; B60K 13/04
See application file for complete search history.

(56) References Cited

U.S. PATENT DOCUMENTS

| | | |
|---|---|---|
| 6,446,616 B1 | 9/2002 | Kabat et al. |
| 2021/0129688 A1 | 5/2021 | Sawada |
| 2023/0193590 A1* | 6/2023 | Dengg .................. E02F 9/0883 |
| | | 37/347 |

FOREIGN PATENT DOCUMENTS

| | | | |
|---|---|---|---|
| WO | 2004060708 A1 | 7/2004 | |
| WO | WO-2016019316 A1 * | 2/2016 | ....... B60K 15/03006 |

OTHER PUBLICATIONS

Italian Search Report for Application No. 102022000017559, Filing Date: Aug. 25, 2022; Date of Mailing: Jul. 7, 2023, 6 pages.

* cited by examiner

*Primary Examiner* — Timothy Hannon
(74) *Attorney, Agent, or Firm* — CANTOR COLBURN LLP

(57) ABSTRACT

A car having: two front wheels; two rear drive wheels; an internal combustion engine, which is powered by hydrogen, is provided with a plurality of cylinders, inside which respective pistons slide, and with a drive shaft connected to the pistons, and is longitudinally arranged in a central or rear position; a transmission system, which connects the drive shaft of the internal combustion engine to the rear drive wheels; and two tanks, which are arranged beside an engine block of the internal combustion engine on the two opposite sides of the internal combustion engine.

21 Claims, 28 Drawing Sheets

CAR PROVIDED WITH A HYDROGEN-POWERED INTERNAL COMBUSTION ENGINE

CROSS-REFERENCE TO RELATED APPLICATIONS

This patent application claims priority from Italian patent application no. 102022000017559 filed on Aug. 25, 2022, the entire disclosure of which is incorporated herein by reference.

FIELD OF THE ART

The present invention relates to a car provided with a hydrogen-powered internal combustion engine.

PRIOR ART

There is no hydrogen in its natural state on earth because it is combined in molecules with other atoms (e.g. water or hydrocarbons) and therefore to obtain hydrogen, it is necessary to produce it by reforming or electrolysis, consuming more energy (hence hydrogen is not an energy source but an energy carrier).

The environmental impact of a car provided with a hydrogen-powered internal combustion engine is much lower than the environmental impact of a similar car provided with a fossil fuel-powered internal combustion engine, as a hydrogen-powered internal combustion engine generates no greenhouse gases ($CO_2$) and generates very little CO, HC and particulate matter (generated due to a small amount of lubricating oil being burnt in the combustion chambers).

Hydrogen has a low density (having a very simple molecule consisting of only two hydrogen atoms) and therefore, in order to be able to store an adequate amount (mass) of hydrogen, it is necessary to use very voluminous hydrogen tanks even when the maximum hydrogen storage pressure reaches 700 bar (which is currently a market standard). Among other things, hydrogen tanks must be placed in a position that is adequately protected against shocks from all directions, and hydrogen tanks must necessarily be either spherical or cylindrical in shape to be able to withstand the high internal pressure of hydrogen; these constraints further complicate the positioning of hydrogen tanks in a car.

Consequently, a car equipped with a hydrogen-powered internal combustion engine is longer and heavier (for the same range) than a similar car equipped with a petrol-powered internal combustion engine, and is therefore significantly impaired in terms of dynamic performance.

DISCLOSURE OF THE INVENTION

The aim of the present invention is to provide a car provided with a hydrogen-powered internal combustion engine that allows high performance (particularly in sports driving on circuits) without penalising range.

According to the present invention, a car provided with a hydrogen-powered internal combustion engine is provided in accordance with the appended claims.

The claims describe preferred embodiments of the present invention forming an integral part of the present description.

BRIEF DESCRIPTION OF THE DRAWINGS

The present invention will now be described with reference to the accompanying drawings, showing some non-limiting embodiments thereof, wherein.

PREFERRED EMBODIMENTS OF THE INVENTION

Figure 1:
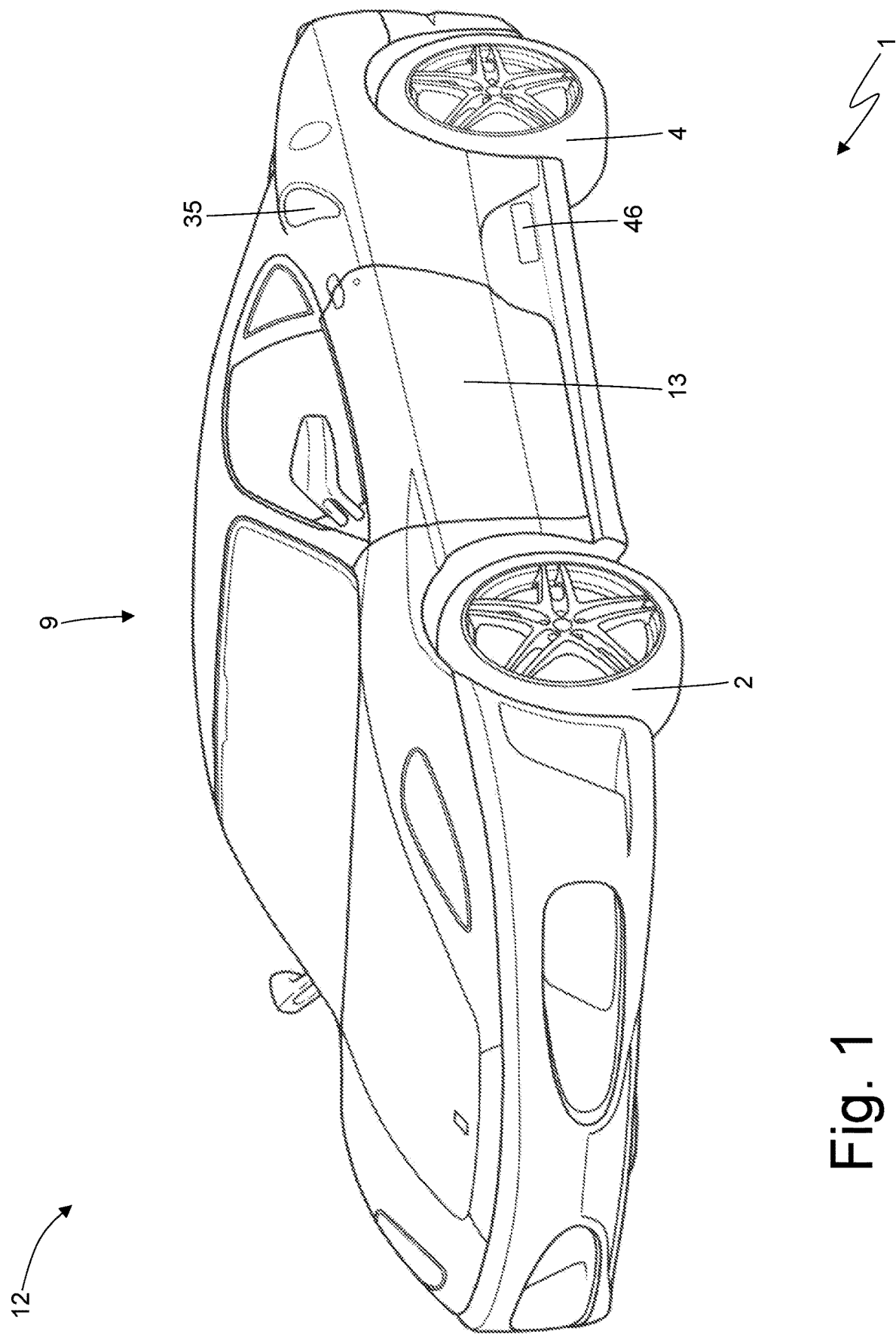
FIG. 1 is a perspective view of a car provided with an internal combustion engine.
Figure 4:
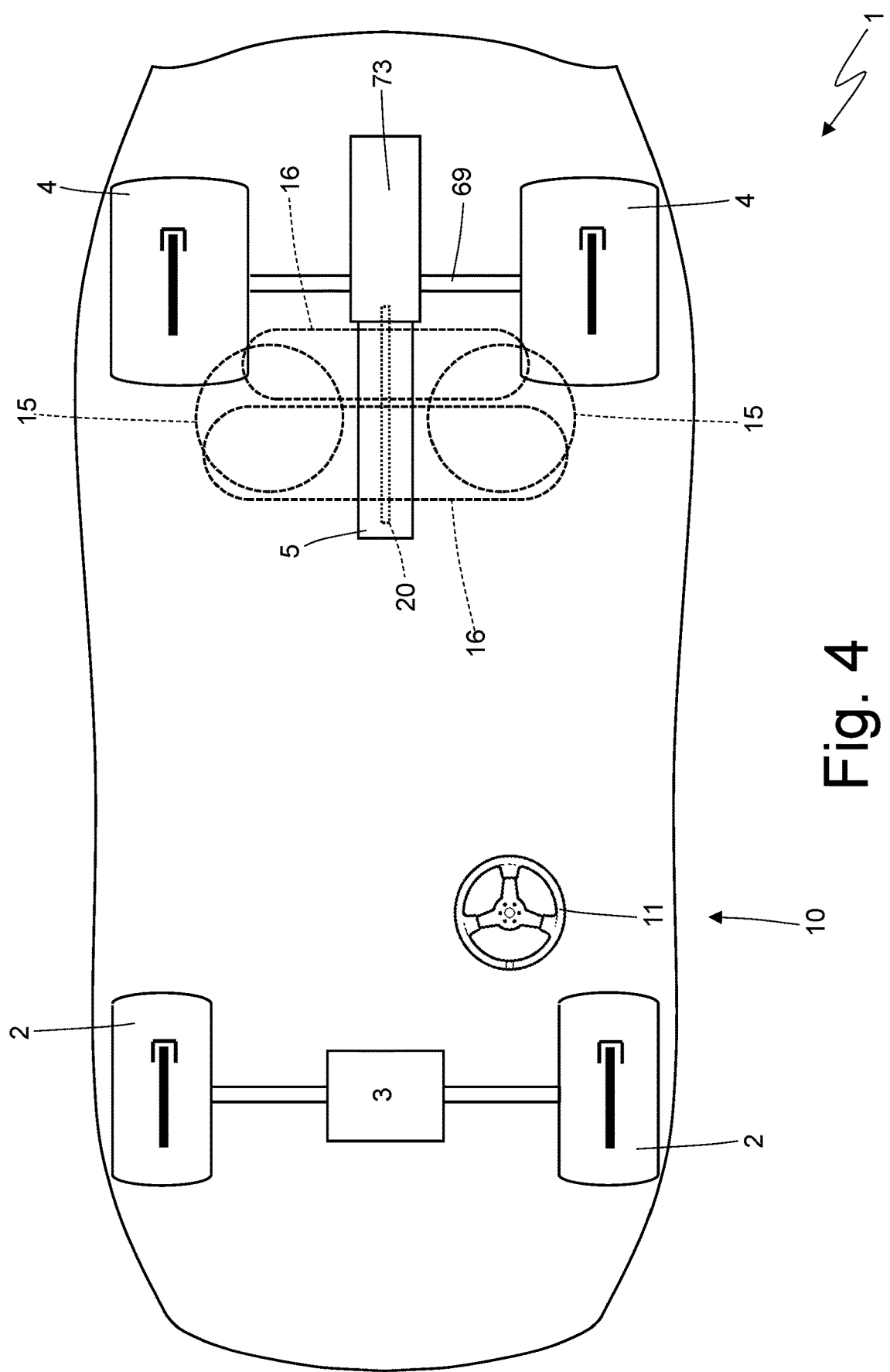
FIG. 4 is a schematic plan view of the car in FIG. 1.

In FIG. 1, the number 1 denotes a hybrid car (i.e. with hybrid propulsion) provided with two front drive wheels 2 receiving drive torque from (at least) one electric machine 3 (illustrated schematically in FIG. 4) and two rear drive wheels 4 receiving drive torque from an internal combustion engine 5 (illustrated schematically in FIG. 4).

Figure 15:
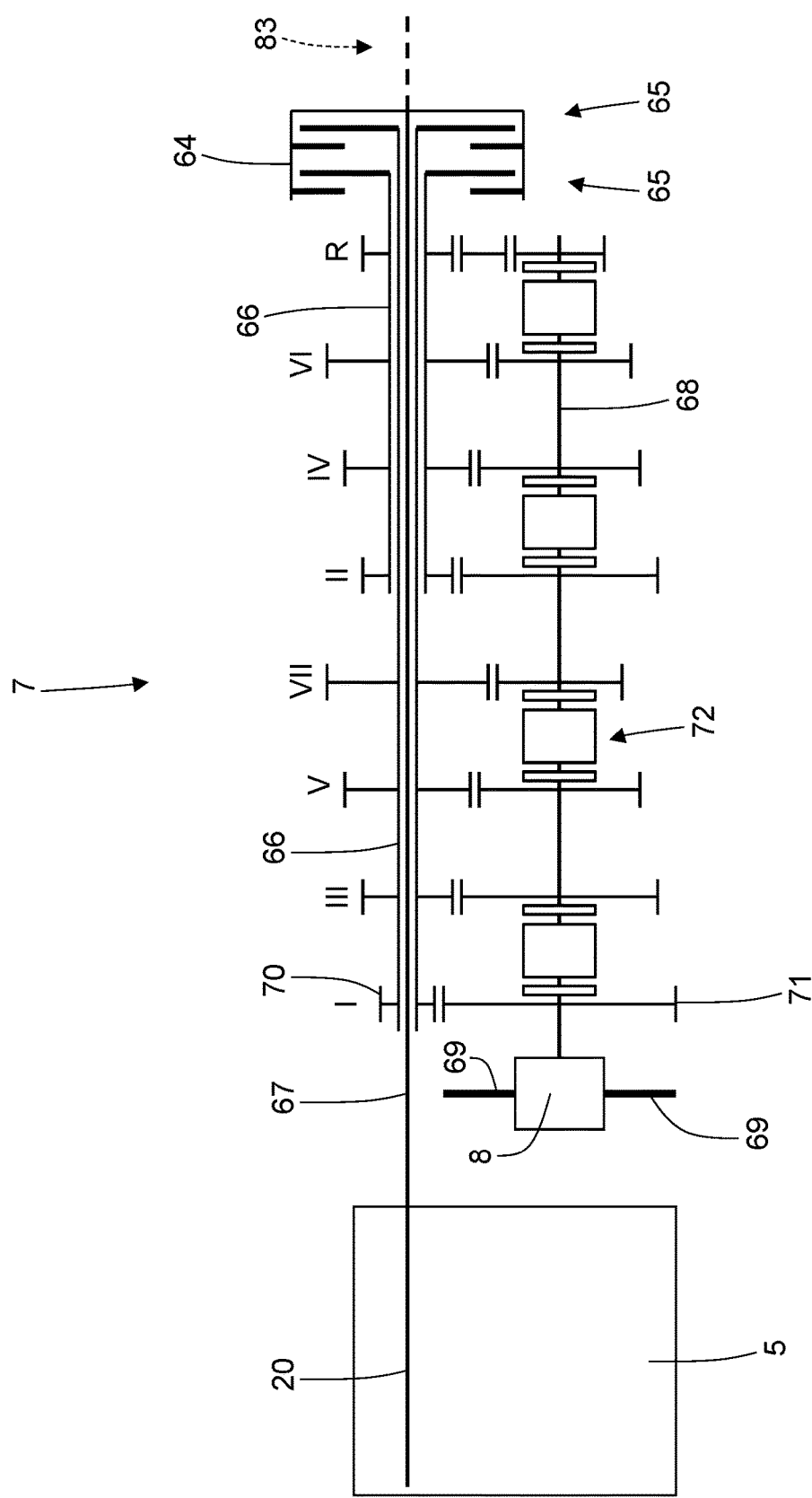
FIG. 15 is a schematic view of the transmission system in FIGS. 13 and 14.

As illustrated in FIG. 4, the electric machine 3 is connected to the two front drive wheels 2 by means of a transmission system (known and not illustrated) provided with a front differential; similarly, the internal combustion engine 5 is also connected to the two rear drive wheels 4 by means of a transmission system 6 provided with a gearbox 7 and a rear differential 8 (illustrated schematically in FIG. 15).

Preferably, the electric machine 3 is reversible (i.e. it can operate either as an electric motor by absorbing electrical energy and generating a mechanical drive torque, or as an electric generator by absorbing mechanical energy and generating electrical energy); according to other embodiments not illustrated, the electric machine 3 is not provided.

Figure 2:
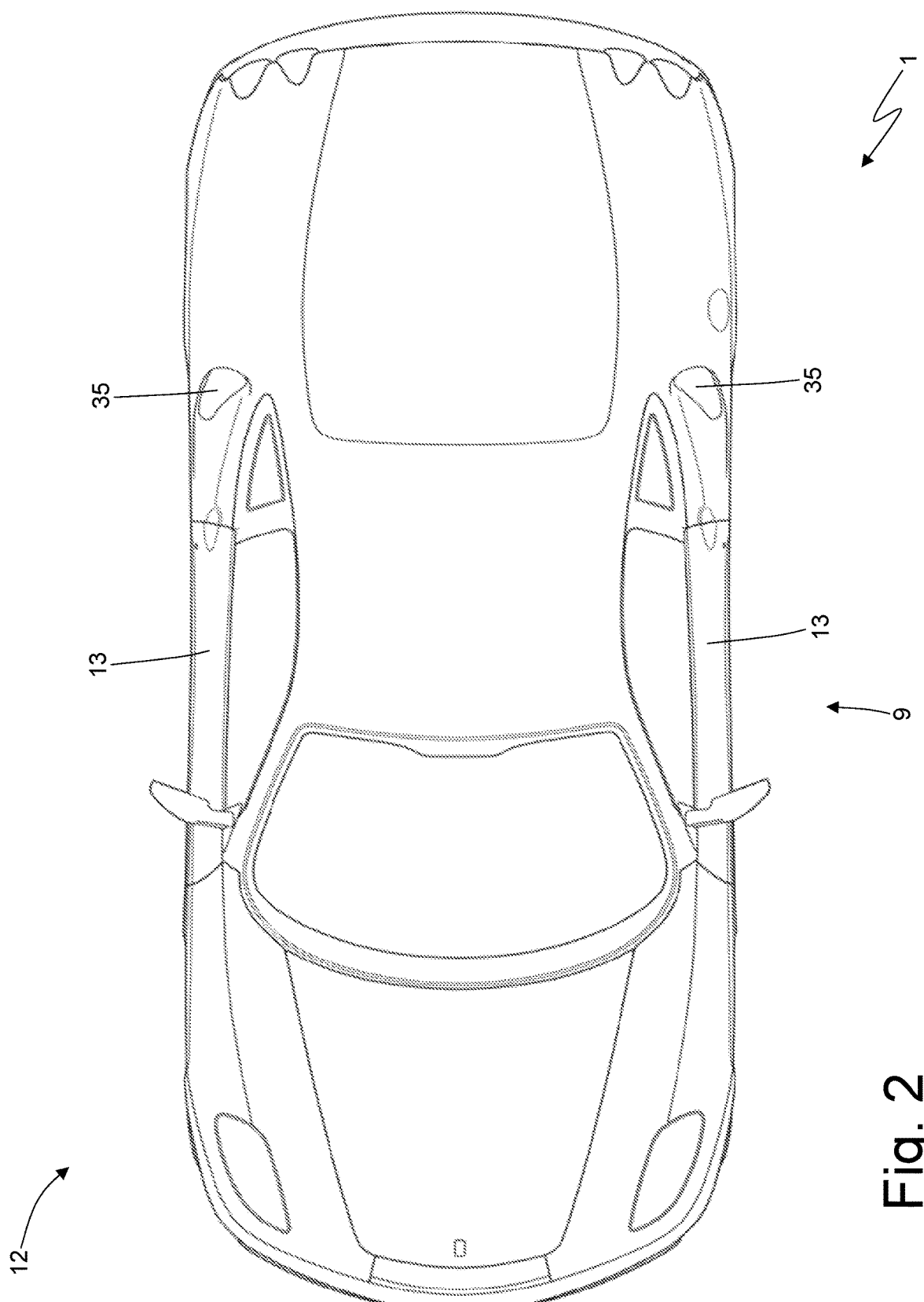
FIGS. 2 and 3 are respectively a top and a bottom view of the car in FIG. 1.

As illustrated in FIGS. 1 and 2, the car 1 comprises a passenger compartment 9 which is arranged between the two front wheels 2 and the two rear wheels 4 and contains within it a driver's station 10 (schematically illustrated in FIG. 4) which is arranged on the left side (alternatively it could also be arranged on the right side). As illustrated in FIG. 4, driver's station 10 comprises a steering wheel 11, a driver's seat (not illustrated) and a number of other (known and not illustrated) driver-operated controls (including, for example, an accelerator pedal, a brake pedal and at least one lever for selecting gears).

As illustrated in FIGS. 1 and 2, the car 1 comprises a body 12 which delimits (among other things) the passenger compartment 9 and has two sides in which at least two doors 13 are obtained. The door 13 on the left provides direct access to driver's station 10.

Figure 3:
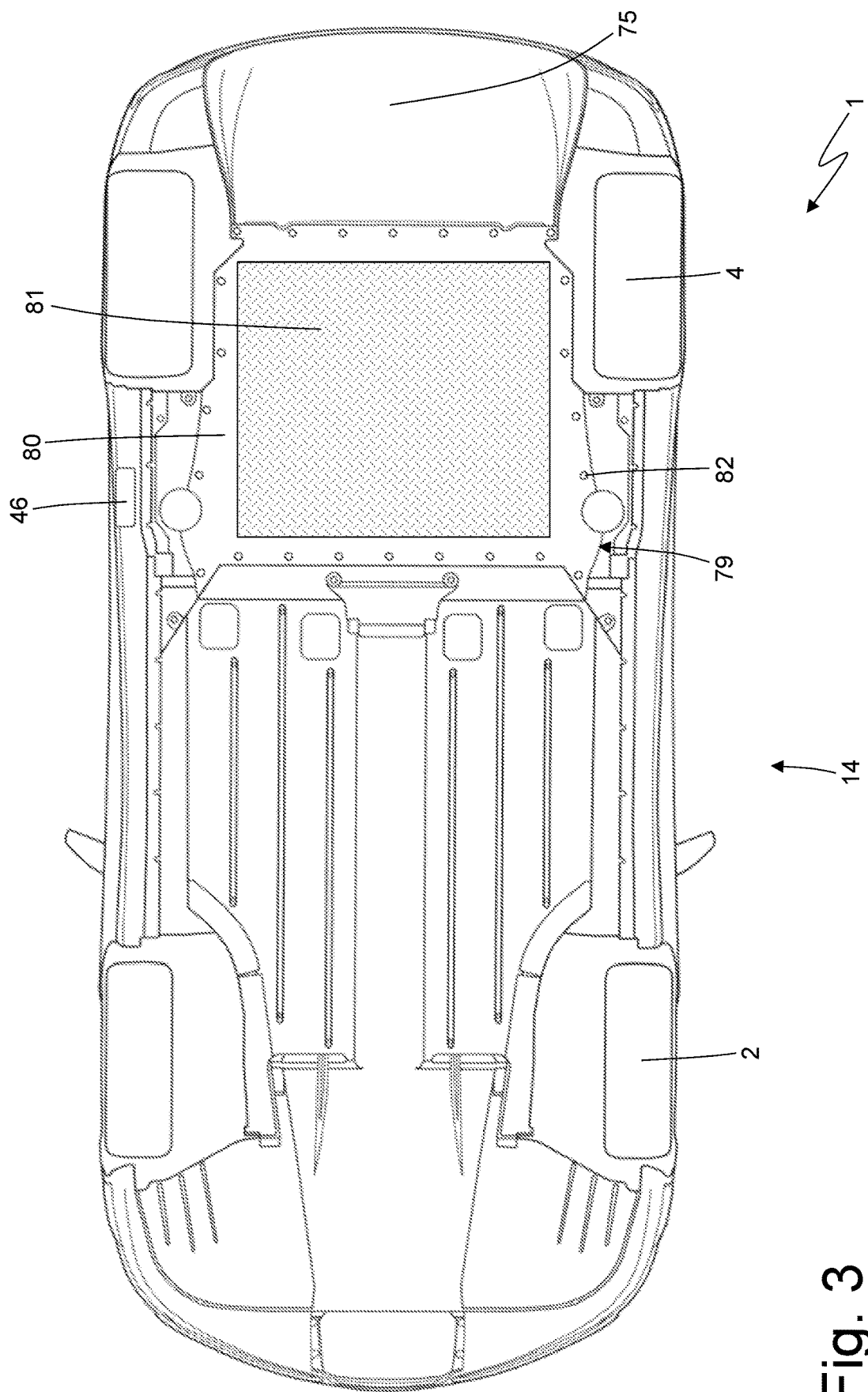

As illustrated in FIG. 3, the car 1 comprises a bottom 14 which forms the lowest part of the car 1 and in use is facing a road surface on which the car 1 moves.

According to one possible embodiment, the internal combustion engine 5 is powered by hydrogen (or other gaseous fuel). According to a different embodiment, the internal combustion engine 5 is powered by petrol (or other liquid fuel).

As illustrated in FIG. 4, the internal combustion engine 5 is powered by hydrogen, which is stored at high pressure (e.g. with a maximum pressure of around 700 bar) in four different tanks 15 and 16: the two tanks 15 have a spherical shape and are the same size, while the two tanks 16 have a cylindrical shape and are different sizes (i.e. one tank 16 is larger than the other tank 16).

The two tanks 15 (spherical in shape) are arranged next to an engine block of the internal combustion engine 5 on opposite sides of the internal combustion engine 5, i.e. one tank 15 is arranged to the right of the engine block of the internal combustion engine 5 while the other tank 15 is arranged to the left of the engine block of the internal combustion engine 5. In other words, the two tanks 15 (spherical in shape) are arranged at the same vertical elevation, are arranged at the same longitudinal elevation and are separated from each other transversely (with the interposition of the engine block of the internal combustion engine 5), i.e. they are only transversely separated from each other.

The two tanks 16 (cylindrical in shape) are arranged above the internal combustion engine 5 in front of each other. In other words, the two tanks 16 (cylindrical in shape) are arranged (roughly) at the same vertical elevation, are arranged at the same transverse elevation and are separated from each other longitudinally, i.e. they are only longitudinally separated from each other (i.e. one is arranged in front of the other). In particular, both tanks 16 (cylindrical in shape) are oriented transversely, i.e. their central axes of symmetry are oriented transversely. In the embodiment illustrated in FIG. 4, the tank 16 arranged in front (i.e. closer to the front) is larger than the tank 16 placed behind (i.e. closer to the rear).

Figure 5:
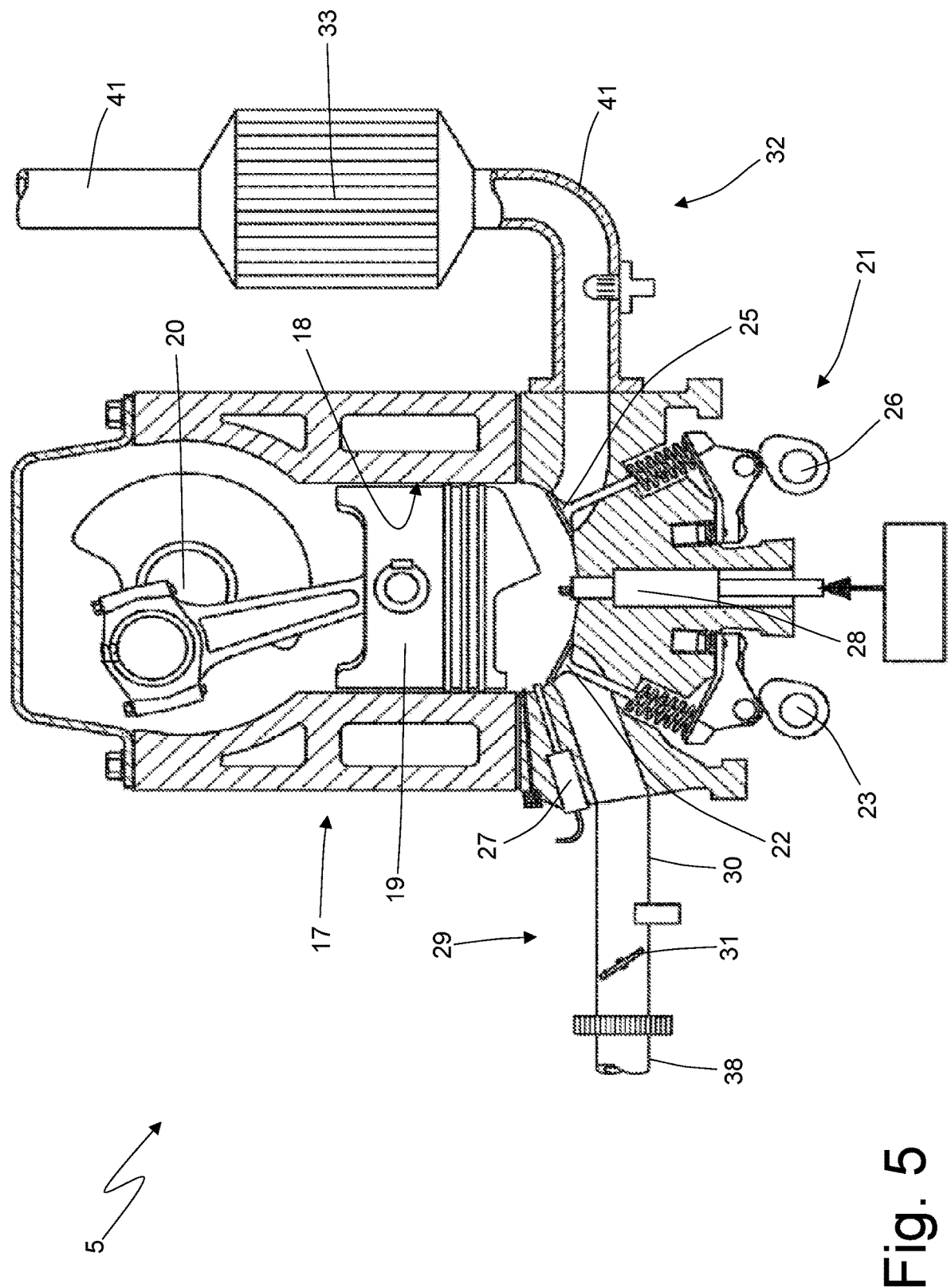
FIG. 5 is a schematic view of the internal combustion engine of the car in FIG. 1.

As illustrated in FIG. 5, the internal combustion engine 5 comprises a crankcase 17 inside of which a plurality of cylinders 18 (only one of which is illustrated in FIG. 5) are housed. Preferably (but not compulsorily), the cylinders 18 are arranged in line as this solution reduces the transverse dimensions of the internal combustion engine and thus, among other things, allows more space for the tanks 15. In the embodiment shown in the appended figures, six cylinders 18 are provided in line, but obviously the number and arrangement of the cylinders 18 could vary.

Each cylinder 18 has a respective combustion chamber and a respective piston 19 mechanically connected to a drive shaft 20 (via a respective connecting rod) to transmit the force generated by combustion to the drive shaft 20. Attached (connected) to the crankcase 17 is a cylinder head 21 which forms the crown of the cylinders 18 (i.e. the upper closure of the cylinders 18 with the so-called "flame plate").

In the case of an in-line arrangement of the cylinders 18 there is a single cylinder head 21, while in the case of a "V" arrangement of the cylinders 18 there are twin cylinder heads 21 for the two banks of cylinders 18.

The combination of the crankcase 17 and the cylinder head 21 constitutes the engine block of the internal combustion engine 5.

In the embodiment illustrated in the accompanying figures, the internal combustion engine 5 is arranged (oriented) longitudinally, i.e. the drive shaft 20 is arranged (oriented) longitudinally, as this solution makes it possible to reduce the transverse footprint of the internal combustion engine 5 and thus, among other things, leave more space for the tanks 15. According to other embodiments not illustrated, the internal combustion engine is arranged (oriented) transversely.

In the embodiment illustrated in the appended figures, the internal combustion engine 5 is either arranged in a central or rear position, i.e. the internal combustion engine is either arranged behind the passenger compartment 9 and is located between the front wheels 2 and the rear wheels 4 (central arrangement as illustrated in the appended FIGS. or is located beyond the rear wheels 4 (rear arrangement not illustrated).

Each cylinder 18 comprises two intake valves 22 controlled by a camshaft 23 which receives motion from the drive shaft 20 via a belt drive 24 (illustrated in FIG. 26); alternatively to the belt drive 24 a chain drive or a gear drive could be used. In addition, each cylinder 18 comprises two exhaust valves 25 controlled by a camshaft 26 which receives motion from the drive shaft 20 via the belt drive 24 (illustrated in FIG. 26). The intake valves 22, exhaust valves 25 and the corresponding control means (i.e. return springs and camshafts 23 and 26) are housed in the cylinder head 21.

Each cylinder 18 also comprises (at least) one fuel injector 27 which injects fuel into the cylinder 18 cyclically; FIG. 5 shows direct fuel injection into the cylinder 18 but fuel injection into the cylinder 18 could also be (partially or fully) indirect. Each cylinder 18 comprises (at least) one spark plug 28 which is cyclically activated to ignite the mixture of air (oxidizer) and fuel in the combustion chamber at the end of the compression phase.

As illustrated in the appended figures, the internal combustion engine 5 is oriented vertically with the drive shaft 20 arranged higher than the cylinders 18. In other words, the internal combustion engine 5 is arranged "upside down" as opposed to the traditional arrangement where the cylinders 18 are at the top and the drive shaft 20 is at the bottom. As a result, the cylinder head 21 that constitutes the crown of the cylinders 18 is arranged below the crankcase 17 and represents the lowest part of the internal combustion engine 5.

The internal combustion engine 5 comprises an intake system 29 that draws air from the outside environment into cylinders 18 (the intake of air into the cylinders 18 is regulated by intake valves 22). Among other things, the intake system 29 comprises an intake manifold 30 that is directly connected to all the cylinders 18; the intake of air into the intake manifold 30 is regulated by a throttle valve 31.

The internal combustion engine 5 comprises an exhaust system 32 that releases the exhaust gases from the cylinder 18 into the external environment. Among other things, the intake system 29 comprises (at least) one exhaust gas treatment device 33 (typically a catalytic converter).

As illustrated in FIGS. 9-12, the intake system 29 comprises twin, separate intake ducts 34 which are arranged on the two sides of the car 1 (i.e. one intake duct 34 is arranged on the right side and the other intake duct 34 is arranged on the left side) and originates from respective air inlets 35 obtained through the bodywork 12. An air filter 36 is arranged along each intake duct 34 and in proximity to the respective air inlet 35. Each intake duct 34 terminates in a compressor unit 37 which increases the air pressure to increase the volumetric efficiency of the cylinders 18. From the compressor unit 37 a sole (single) intake duct 38 originates, which terminates in the intake manifold 30 after passing through two intercoolers 39 and 40 arranged in series. That is, an initial section of the intake duct 38 connects the compressor unit 37 to the intercooler 39, then an intermediate section of the intake duct 38 connects the intercooler 39 to the intercooler 40, and finally a final section of the intake duct 38 connects the intercooler 40 to the intake manifold 30.

According to a preferred embodiment, the intercooler 39 is of the air/air type and the intercooler 40 is also of the air/air type. According to a preferred embodiment, the intercooler 39 has a larger volume than the intercooler 40; on this subject it is important to note that the intercooler 39 is at a disadvantage with respect to the intercooler 40, since it is arranged further away from the corresponding air inlet and compensates for this disadvantage both by having a larger volume and by having to cool air with a higher inlet temperature (since the intercooler 39 receives air directly from the compressor unit 37 while the intercooler 40, being arranged in series with the intercooler 39, receives air which has already been partially cooled by the intercooler 39).

As illustrated in FIGS. 9-12, the exhaust system 32 comprises twin, separate exhaust ducts 41 that receive exhaust gases from the respective cylinders 18 to which they are individually connected; in particular, each exhaust duct 41 is connected to three cylinders 18 by respective channels that originate from the three cylinders 18 and terminate in an inlet of the exhaust duct 41 (from another viewpoint, each exhaust duct 41 is initially divided into three parts to connect with the respective three cylinders 18). A corresponding exhaust gas treatment device 33 (typically a catalytic converter) is arranged along each exhaust duct 41; thus altogether the exhaust system 32 comprises two twin, separate exhaust gas treatment devices 33.

A turbine unit 42 is arranged along the exhaust ducts 41 provided with twin turbines 43 (better illustrated in FIG. 17), each of which is coupled to a corresponding exhaust duct 41. That is, each exhaust duct 41 passes through a respective turbine 43 and the two turbines 43 are arranged side by side to form the turbine unit 42. In other words, there is a turbine 43 that is connected along each exhaust duct 41 and is arranged alongside the engine block (consisting of the crankcase 17 and cylinder head 21) of the internal combustion engine 5.

The two exhaust ducts 41 terminate in a single common silencer 44 that receives the exhaust gases from both exhaust ducts 41. In other embodiments not illustrated, there are twin and separate silencers 44, each of which only receives exhaust gases from a respective exhaust duct 41.

In the preferred embodiment illustrated in the appended figures, the silencer 44 has a single final exhaust pipe 45 flowing into an outlet opening 46; according to other embodiments not illustrated, the silencer 44 has two or more final pipes 45, each flowing into a corresponding outlet opening 46.

Figure 16:
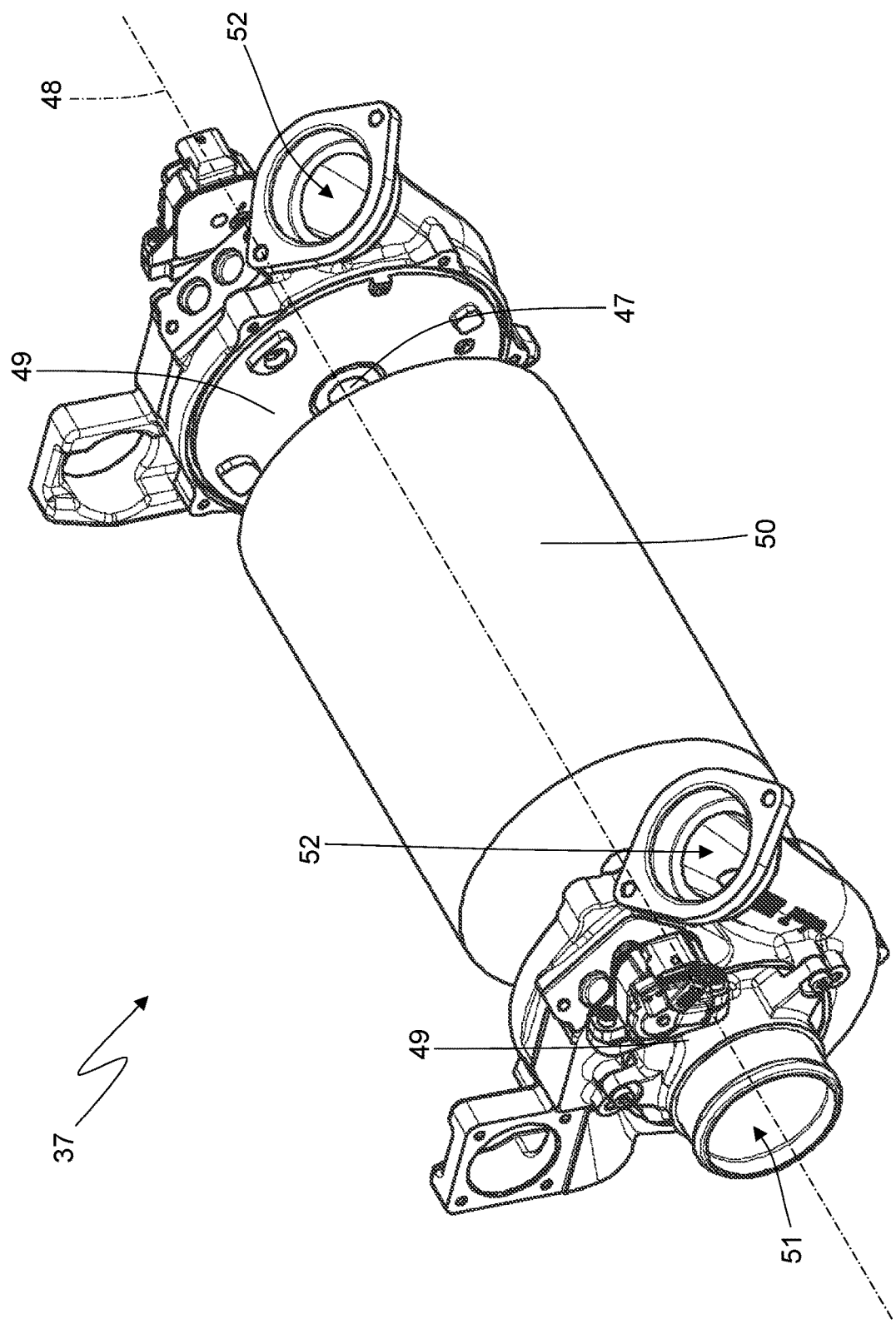
FIG. 16 is a perspective view of a compressor unit of the internal combustion engine of the car in FIG. 1.

As illustrated in FIG. 16, the compressor unit 37 (intended for use in the supercharged internal combustion engine 5) comprises a single shaft 47 mounted rotatably about an axis of rotation 48. In the embodiment illustrated in the appended figures, the shaft 47 (thus the axis of rotation 48) is oriented transversely; according to a different embodiment not illustrated, the shaft 47 (thus the axis of rotation 48) is oriented longitudinally or is inclined (non-parallel) with respect to both the longitudinal direction and with respect to the transverse direction.

The compressor unit 37 comprises twin (identical) compressors 49, each of which is integral with the shaft 47 to rotate together with the shaft 47 and is configured to compress air intended to be sucked in by the supercharged internal combustion engine 5; in particular, each compressor 49 receives air from a respective intake duct 34 (i.e. each intake duct 34 terminates in a corresponding compressor 49).

The compressor unit 37 comprises a single common electric motor 50 which is integral with the shaft 47 to bring the shaft 47 into rotation (and thus to bring both compressors 49 mounted on the shaft 47 into rotation). In the embodiment illustrated in the appended figures, the electric motor 50 is arranged between the two compressors 49 and is perfectly equidistant from the two compressors 49; according to a different embodiment not illustrated, the electric motor 50 is arranged to one side with respect to both compressors 49 (i.e. it is closer to one compressor 49 and is further away from the other compressor 49).

As mentioned above, the two compressors 49 are identical and are of the centrifugal type. In particular, each compressor 49 comprises an axial inlet 51 arranged on the opposite side of the shaft 47 and connected to a respective intake duct 34 and a radial outlet 52. According to a preferred embodiment, the compressor unit 37 comprises a connecting duct 53 (illustrated in FIGS. 9-12) which is connected to both outlets 52 of the two compressors 49 to receive and join the compressed air from both compressors 49; the connecting duct 53 terminates in the intake duct 38, i.e. the intake duct 38 starts from the connecting duct 53 to receive and join the compressed air from both compressors 49.

In the embodiment illustrated in the appended figures, the connecting duct 53 is oriented transversely; according to a different embodiment not illustrated, the connecting duct 53 is oriented longitudinally or is inclined (non-parallel) with respect to both the longitudinal direction and with respect to the transverse direction.

In the embodiment illustrated in the appended figures, the connecting duct 53 is oriented parallel to the shaft 47 (thus to the axis 48 of rotation); according to a different embodiment not illustrated, the connecting duct 53 is not oriented parallel to the shaft 47 thus to the axis 48 of rotation).

Figure 17:
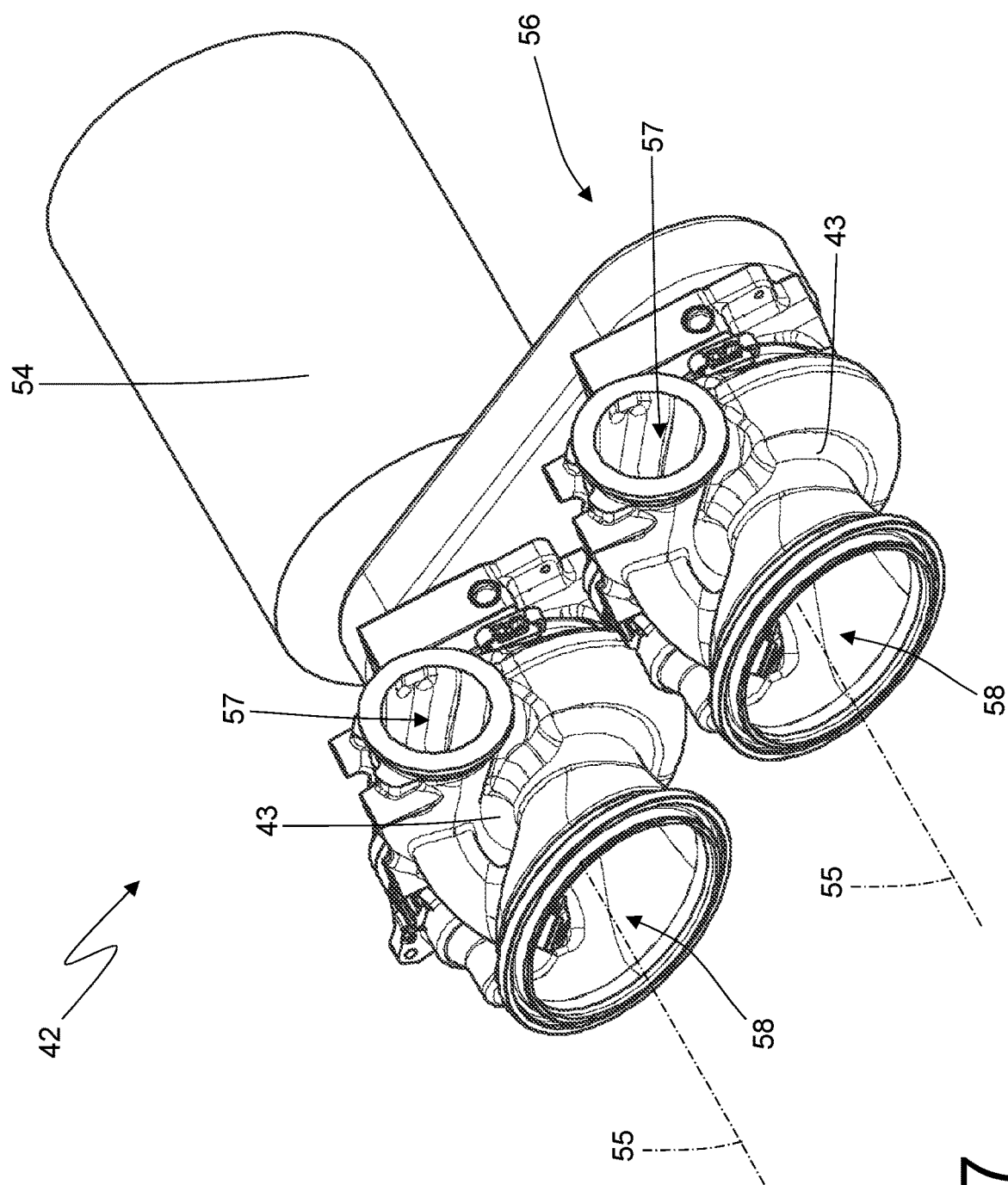
FIG. 17 is a perspective view of a turbine unit of the internal combustion engine of the car in FIG. 1.
Figure 18:
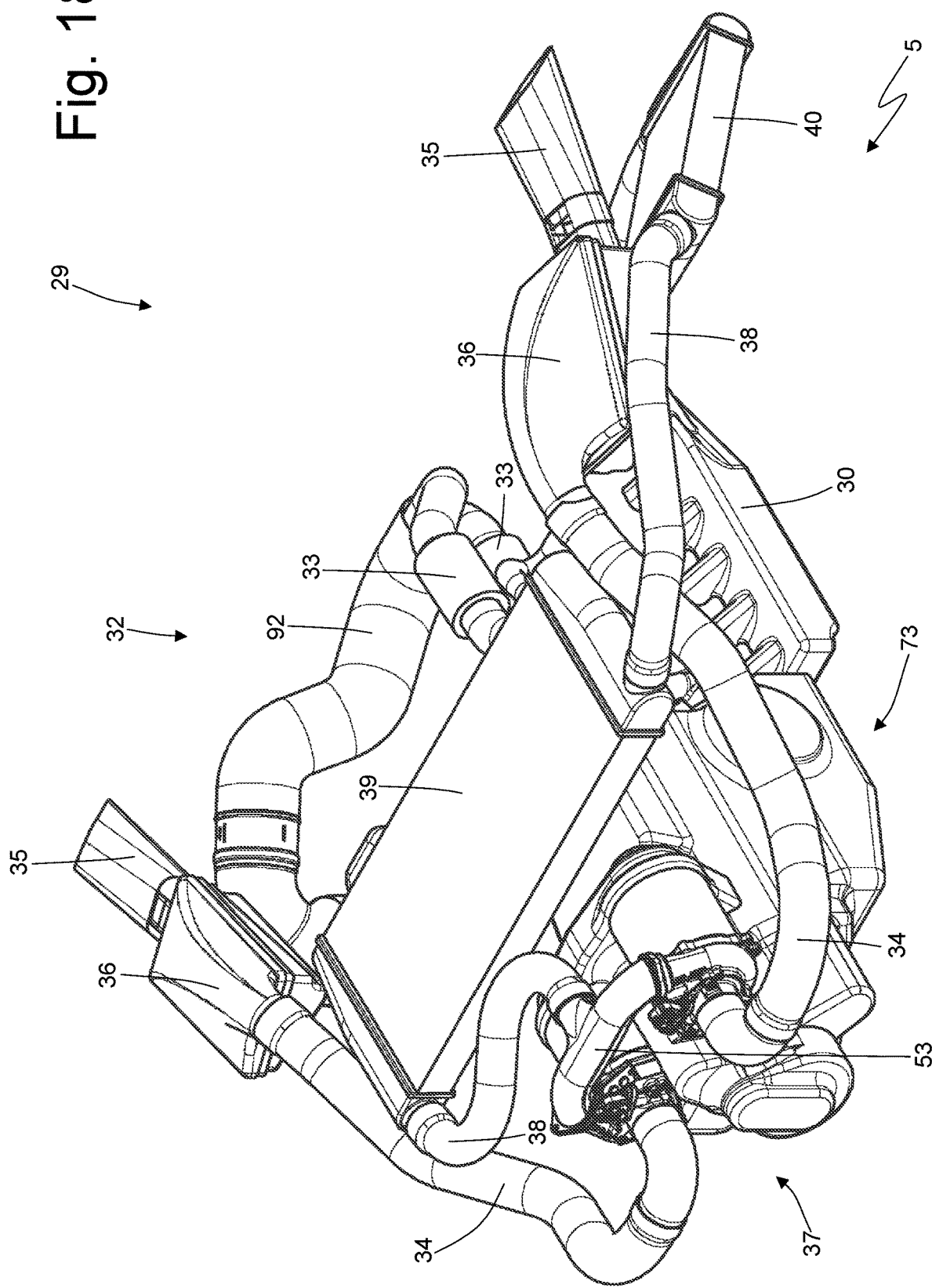
FIGS. 18-21 are respectively two different perspective views, a top and a bottom view of an alternative embodiment of the internal combustion engine.
Figure 19:
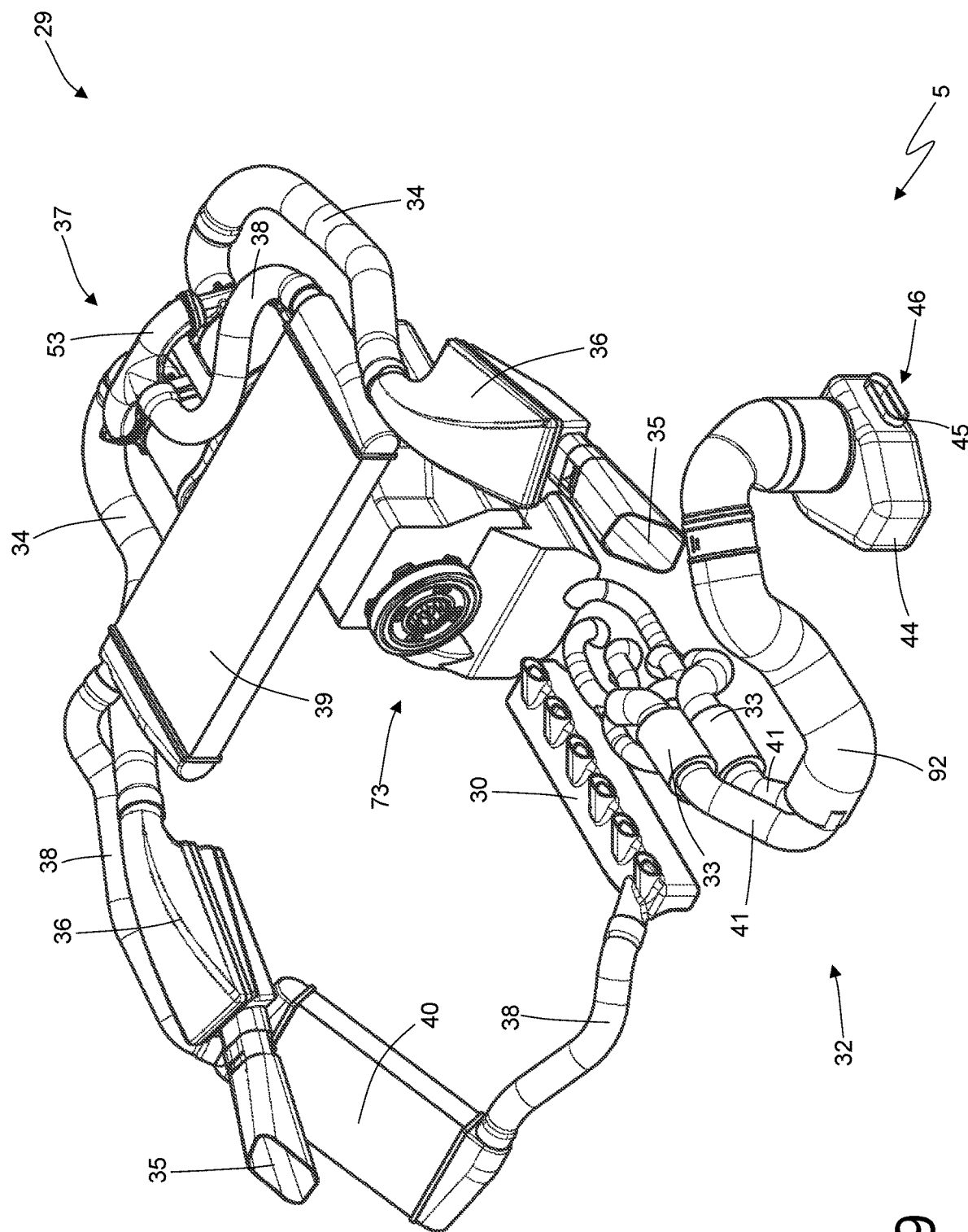
Figure 20:
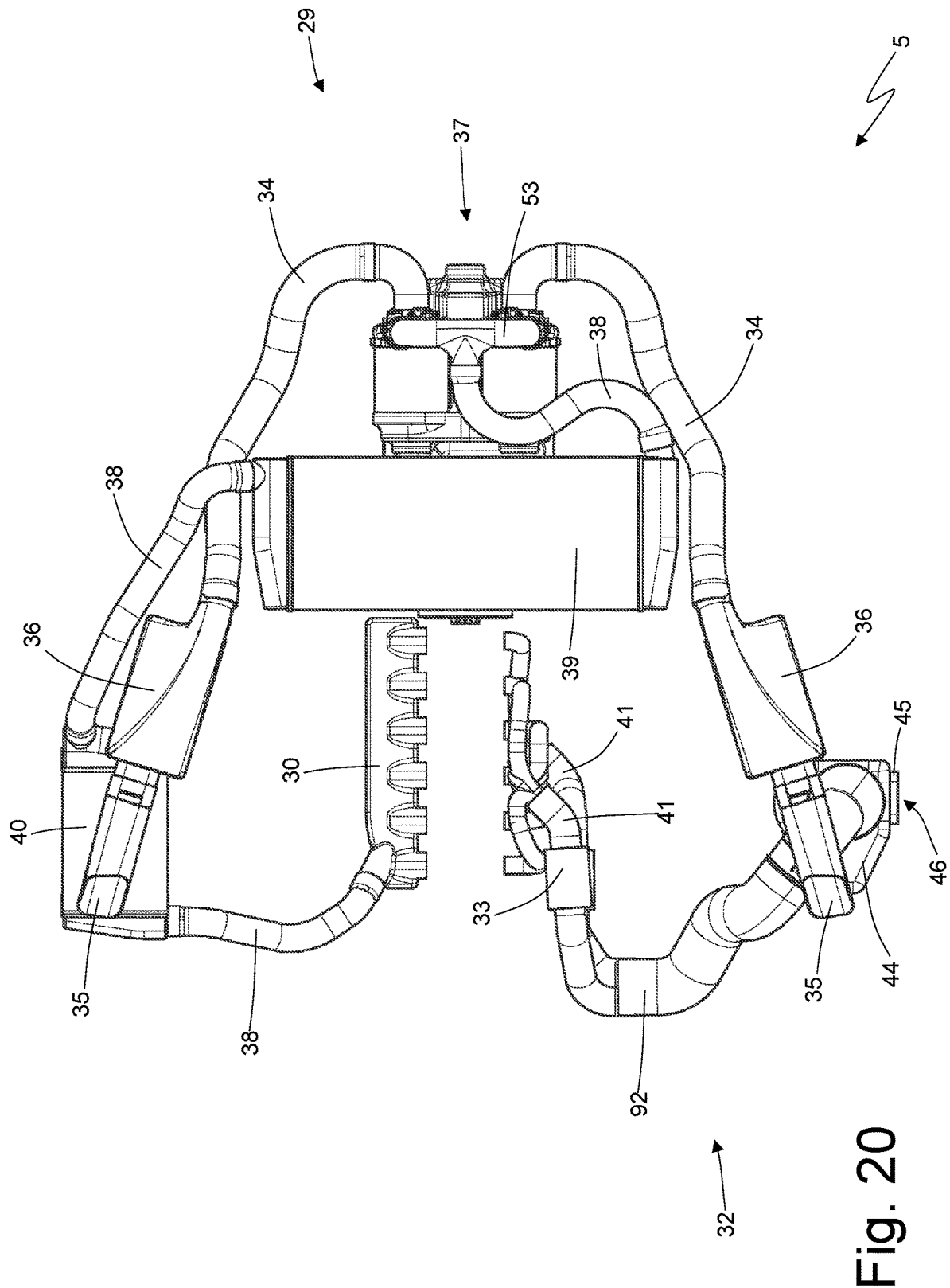
Figure 21:
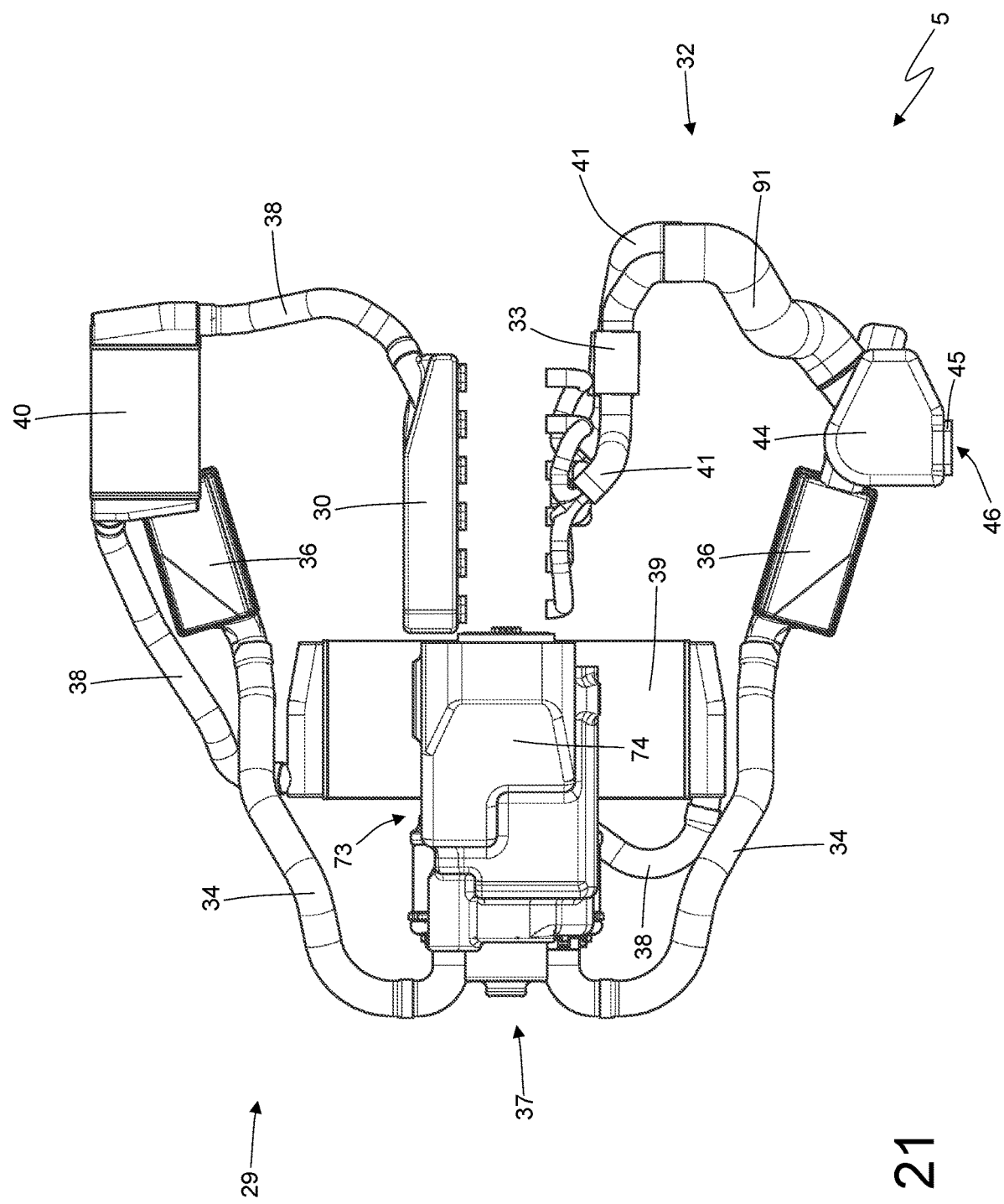

As illustrated in FIG. 17, the turbine unit 42 comprises twin (identical) turbines 43 that drive the same electric generator 54 together. In particular, the two turbines 43 are arranged side by side and have two respective axes 55 of rotation parallel to each other and spaced apart. The turbine unit 42 comprises a transmission device 56 that connects both turbines 43 to the same electric generator 54. The transmission device 56 comprises two toothed wheels, each of which is integral with the shaft of a corresponding turbine 43 to receive the rotary motion from the turbine 43, and a connecting element (a toothed belt, a chain, a cascade of gears) that links the two toothed wheels together in such a way as to make both toothed wheels rotate together and at the same speed. According to one possible embodiment, a toothed wheel of the two toothed wheels of the transmission device 56 is directly coupled to a shaft of the electric generator 54 such that the electric generator 54 rotates at the same rotational speed as the two turbines 43; alternatively, a toothed wheel of the two toothed wheels of the transmission device 56 is connected to the shaft of the electric generator 54 by the interposition of a speed reducer (typically a gear speed reducer) such that the electric generator 54 rotates at a rotational speed lower than the rotational speed of the two turbines 43.

According to a preferred embodiment illustrated in the appended figures, the electric generator 54 is coaxial to a turbine 43; that is, one turbine 43 and the electric generator 54 rotate about the same first axis 55 of rotation while the other turbine 43 rotates about a second axis 55 of rotation parallel to, and spaced from, the first axis 55 of rotation.

The two turbines 43 are identical and are of the centrifugal type. In particular, each turbine 43 comprises a radial inlet 57 connected to one side of the respective exhaust duct 41 and an axial outlet 52 arranged on the opposite side of the transmission device 56 and connected to another side (flowing into the silencer 44) of the respective exhaust duct 41.

Figure 11:
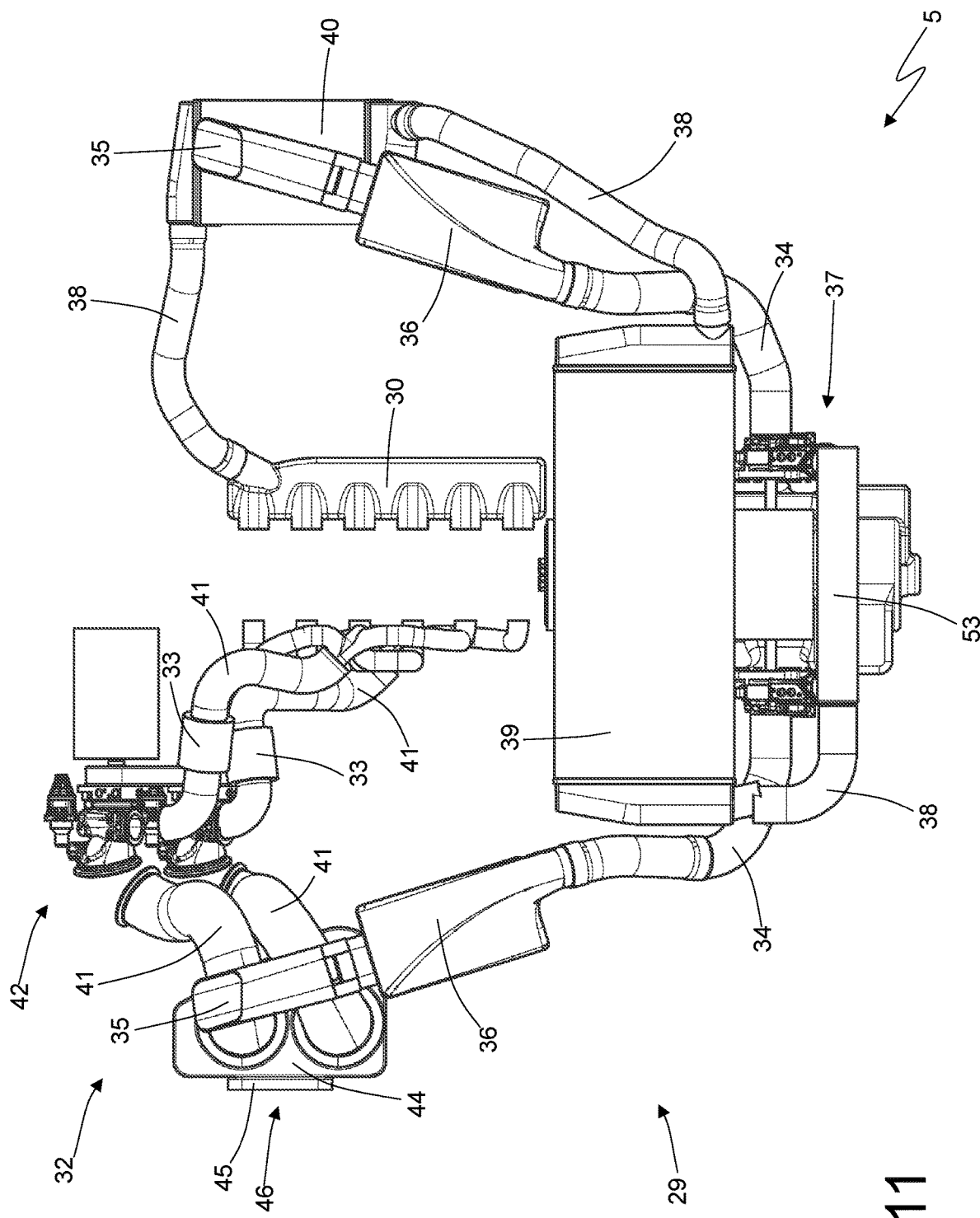
Figure 12:
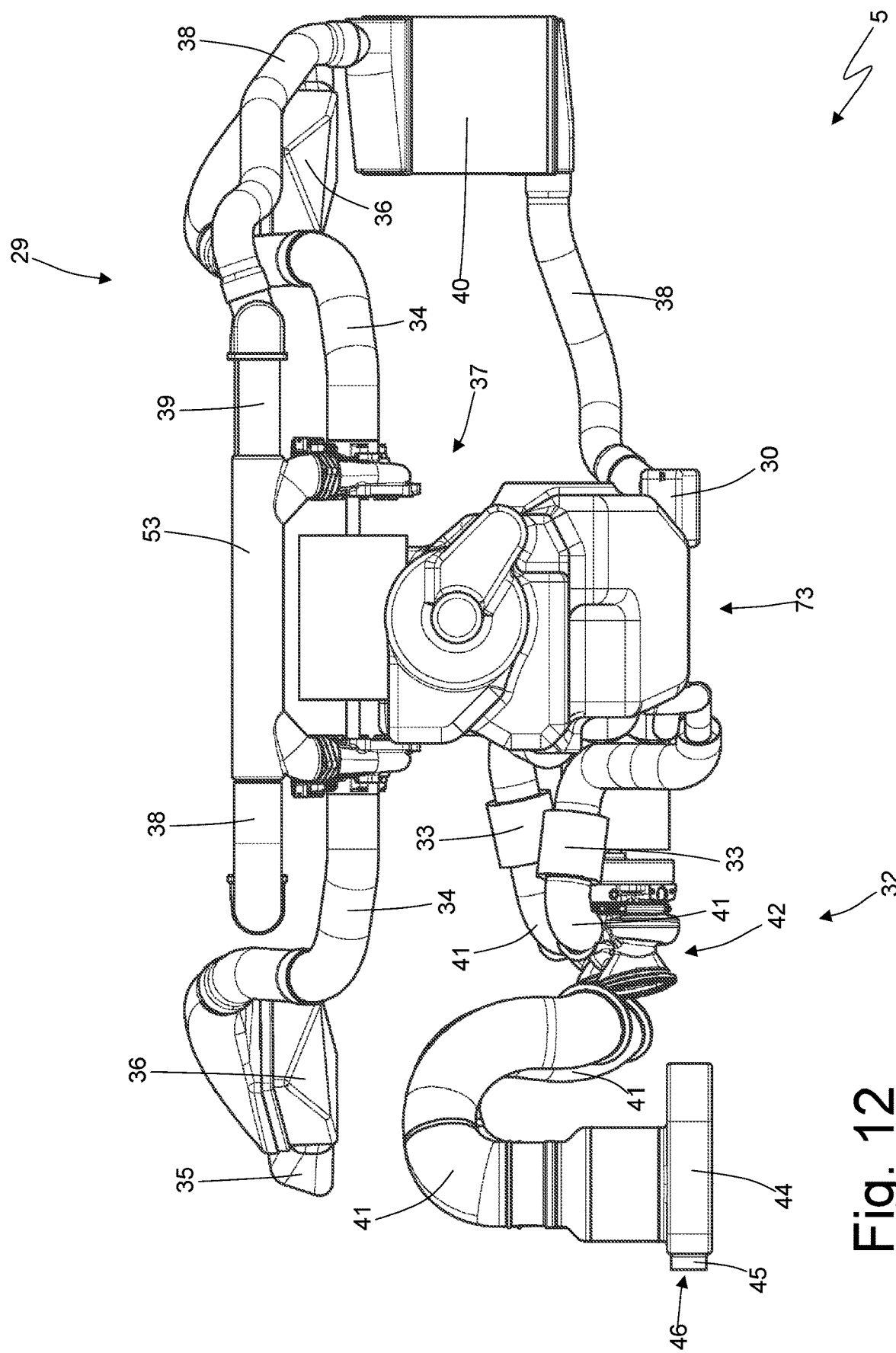

According to a preferred embodiment better illustrated in FIGS. 11 and 12, the silencer 41 is arranged next to an engine block (consisting of the crankcase 17 and cylinder head 21) of the internal combustion engine 5 (on the exhaust valve side 25). The outlet opening 46 of the silencer 41 is obtained through a sidewall of the car 1 (as illustrated in FIG. 1) or, according to an alternative embodiment, through the bottom 14 of the car 1 (as illustrated in FIG. 3).

In other words, the outlet opening 46 of the silencer 44 is arranged asymmetrically at only one side of the car 1 and is located between a rear wheel 4 and a door 13. According to a preferred embodiment, the outlet opening 46 of the silencer 44 is arranged on the side where the driver's station 16 is located, so that the driver sitting in the driver's station 16 is close to the outlet opening 46 of the silencer 44 and is therefore in the best position to optimally hear the noise diffused through the outlet opening 46 of the silencer 44.

In the embodiment illustrated in FIG. 1, the outlet opening 46 of the silencer 44 is obtained through a sidewall of the body 12, while in the alternative embodiment illustrated in FIG. 3, the outlet opening 46 of the silencer 44 is obtained through the bottom 14.

In the embodiment illustrated in the appended figures, the silencer 44 comprises a single outlet opening 46; according to other embodiments not illustrated, the silencer 44 comprises several outlet openings 46 which may be more or less side-by-side (it is also possible that one outlet opening 46 of the silencer 44 is obtained through a sidewall of the body 12 while the other outlet opening 46 of the silencer 44 is obtained through the bottom 14).

According to a preferred embodiment better illustrated in FIGS. 11 and 12, the silencer 44 is arranged on one side of the car 1 alongside an engine block (consisting of the crankcase 17 and cylinder head 21) of the internal combustion engine 5 and in front of a rear drive wheel 4.

According to a preferred embodiment better illustrated in FIGS. 11 and 12, the turbine unit 42 is arranged alongside an engine block (consisting of the crankcase 17 and cylinder head 21) of the internal combustion engine 5 (on the exhaust valve side 25). In particular, the turbine unit 42 is arranged between the internal combustion engine (i.e. between the engine block consisting of the crankcase 17 and cylinder head 21) and the silencer 44; in this way, the exhaust ducts 41 are particularly short and relatively untwisted.

In the embodiment illustrated in FIGS. 9-12, the compressor unit 37 (comprising twin compressors 49) is connected between the two intake ducts 34 and 38, is arranged behind the engine block (comprising the crankcase 17 and cylinder head 21) of the internal combustion engine 5, is arranged higher up than the engine block of the internal combustion engine 5, and is driven by the electric motor 50.

As better illustrated in FIGS. 9-12, the compressor unit 37 (comprising the two twin compressors 49) is arranged at the rear behind the intercooler 39 (i.e. the two compressors 49 of the compressor unit 37 are arranged at the rear behind the intercooler 39). The intercooler 39 is horizontally oriented and is arranged behind (at the rear) the engine block (consisting of the crankcase 17 and cylinder head 21) of the internal combustion engine 5; in particular, the intercooler 39 is arranged higher up than the engine block of the internal combustion engine 5 and is located behind the engine block of the internal combustion engine 5. Instead, the intercooler 40 (connected in series to the intercooler 39 along the intake duct 38) is arranged on one side of the car 1 next to the engine block (consisting of the crankcase 17 and cylinder head 21) of the internal combustion engine 5 and in front of a rear drive wheel 4. In particular, the intercooler 40 is arranged on one side of the car 1 opposite the silencer 44; that is, the intercooler and the silencer 44 are arranged on opposite sides of the car 1 separated from each other by the engine block (consisting of the crankcase 17 and the cylinder head 21) of the internal combustion engine 5. In other words, the intercooler 40 and silencer 44 are arranged on opposite sides of the engine block of the internal combustion engine 5.

Figure 28:
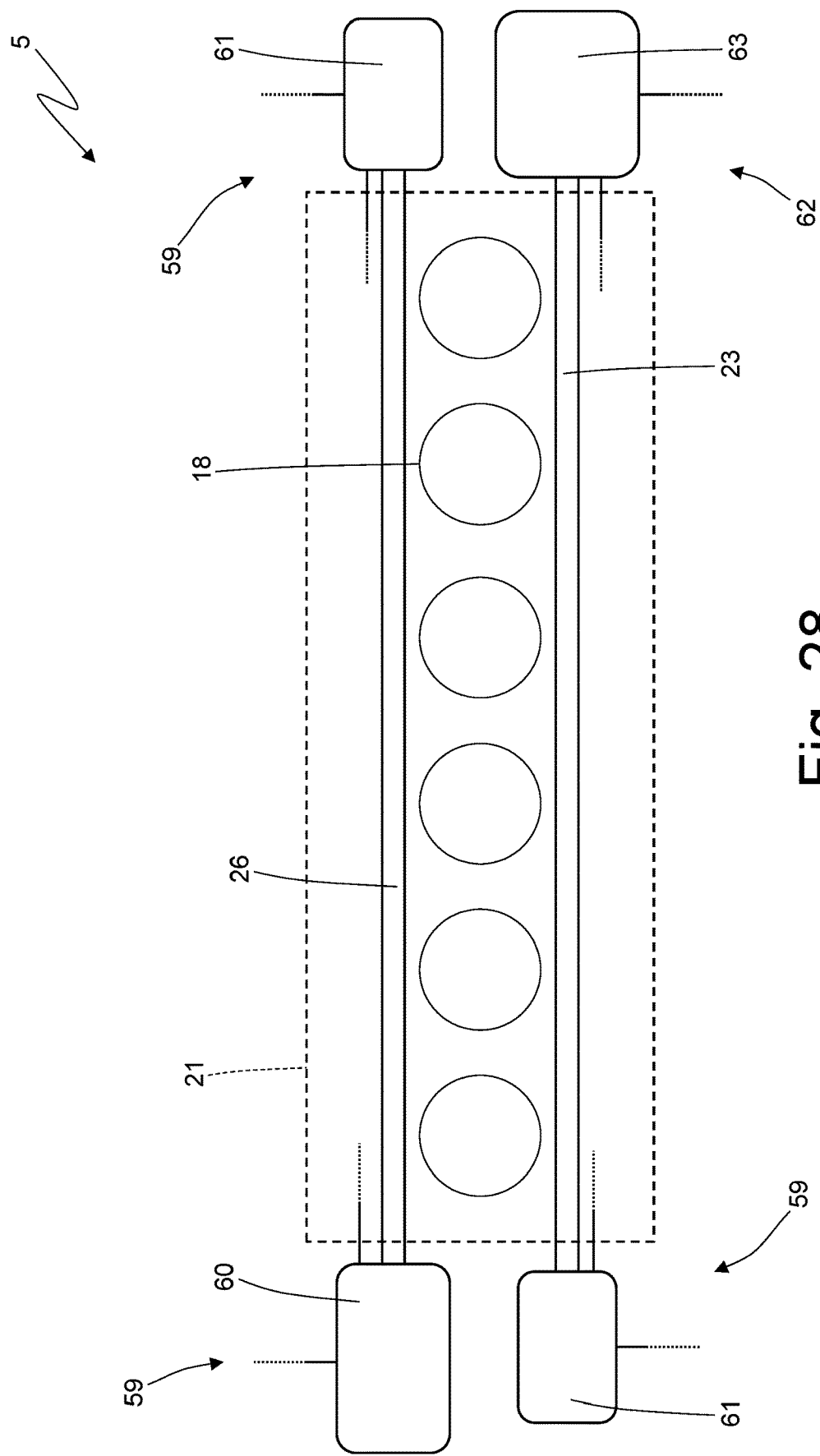

As illustrated in FIG. 28, the internal combustion engine 5 comprises a dry sump lubrication circuit 59 that circulates a lubricating oil through all the moving parts of the internal combustion engine 5. The lubrication circuit 59 comprises a delivery lubrication pump 60 configured to circulate lubricating oil; that is, the delivery lubrication pump 60 draws lubricating oil from an oil reservoir to send lubricating oil into the engine block (comprising the crankcase 17 and the cylinder head 21). The lubrication circuit 59 comprises two recovery lubrication pumps 61 configured to circulate lubricating oil; that is, each recovery pump 61 draws oil from the engine block (consisting of the crankcase 17 and the cylinder head 21) and in particular from the lowest part of the engine block and then from cylinder head 21 to send the lubricating oil into the reservoir (which is arranged higher up than the cylinder head 21).

According to a preferred embodiment, the two recovery lubrication pumps 61 are arranged on opposite sides of the cylinder head 21, so that lubrication oil is drawn from opposite areas of the cylinder head 21.

As illustrated in FIG. 28, the internal combustion engine 5 comprises a cooling circuit 62 that circulates a coolant (e.g. a mixture of water and glycol) in the engine block (consisting of the crankcase 17 and the cylinder head 21) of the internal combustion engine 5. The cooling circuit 62 comprises a cooling pump 63 configured to circulate the coolant.

Figure 27:
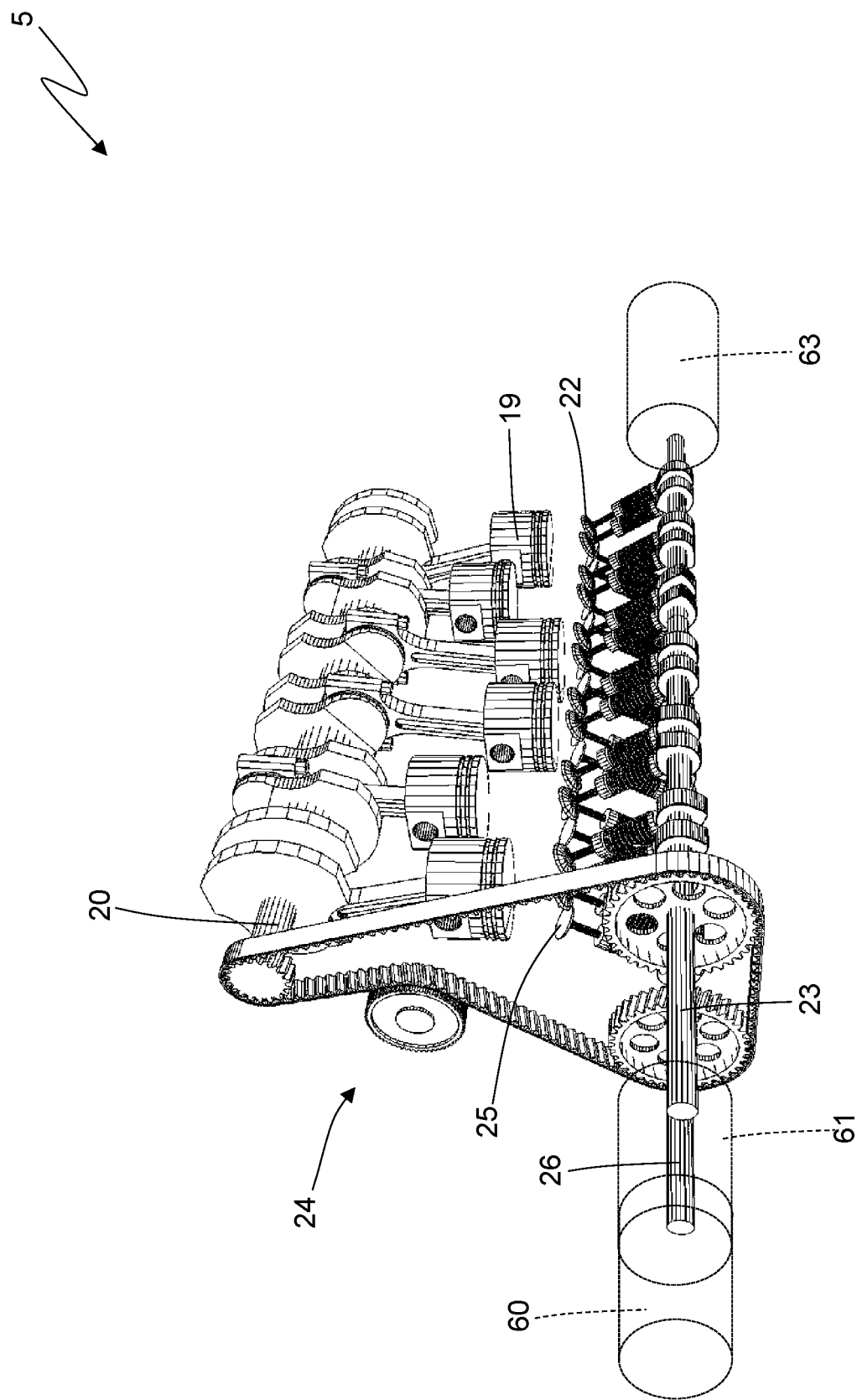
FIGS. 27 and 28 are respectively a perspective and schematic view of two camshafts of the internal combustion engine with the arrangement of lubrication pumps and a cooling pump highlighted.

As illustrated in FIGS. 27 and 28, the camshaft 23 protrudes axially from the cylinder head 21 on both sides: a lubrication pump 61 is arranged coaxially to the camshaft 23 and is directly connected to the camshaft 23 to be rotated by the camshaft 23, and similarly the cooling pump 63 is arranged coaxially to the camshaft 23 on the opposite side of the lubrication pump 61 and is directly connected to the camshaft 23 to be rotated by the camshaft 23.

As illustrated in FIGS. 27 and 28, the camshaft 26 protrudes axially from the cylinder head 21 on both sides: the other lubrication pump 61 (other than the lubrication pump 61 connected to the camshaft 23) is arranged coaxially to the camshaft 26 and is directly connected to the camshaft 26 to be rotated by the camshaft 26, and similarly, the lubrication pump 60 is arranged coaxially to the camshaft 26 on the opposite side of the lubrication pump 61 and is directly connected to the camshaft 26 to be rotated by the camshaft 26.

In this way, all four pumps 60, 61 and 63 are coaxial to the respective camshafts 23 and 26 and are rotated directly by the respective camshafts 23 and 26.

According to other embodiments not illustrated, the number of pumps 60, 61 and 63 is different (smaller) because, for example, only a delivery lubrication pump 61 may be provided; in this case (at least) one camshaft 23 or 26 protrudes axially from the cylinder head 21 on one side only.

According to other embodiments not shown, the arrangement of the pumps 60, 61 and 63 could be different, i.e. they could vary: for example, the cooling pump 63 could be connected to the camshaft 26 or the lubrication pump 60 could be connected to the camshaft 23.

As illustrated in FIG. 15, the gearbox 7 is directly connected to the drive shaft 20 of the internal combustion engine 5, is aligned with the internal combustion engine 5, and is arranged behind the internal combustion engine 5. In particular, the gearbox 7 is vertically aligned with an upper part of the engine block of the internal combustion engine 5; i.e. the gearbox 7 is vertically aligned with the upper part of the crankcase 17.

The 7 gearbox is a double clutch and is interposed between the drive shaft 20 of the internal combustion engine and the rear drive wheels 4. The gearbox 7 comprises a basket 64 that is brought into rotation by the drive shaft and two clutches 65 contained side by side in the basket 64 to take motion from the basket 64. Furthermore, the gearbox 7 comprises two primary shafts 66 which are coaxial with each other, are inserted one inside the other, and are each connected to a corresponding clutch 65 to receive motion from the corresponding clutch 65. Each clutch 65 comprises driving discs which are integral with the basket 64 (thus they always rotate together with the drive shaft 20 to which the basket 64 is constrained) and driving discs which are interspersed with the driving discs and are integral with the corresponding primary shafts 66 (thus they always rotate together with the corresponding primary shafts 66).

The basket 64 of the dual clutch 65 gearbox 7 is arranged on the opposite side of the internal combustion engine 5 (i.e., the drive shaft 20) from the two primary shafts 66; furthermore, the dual clutch 65 gearbox 7 comprises a drive shaft 67 which connects the drive shaft 20 to the basket 64, is coaxial to the two primary shafts 66, and is inserted into the two primary shafts 66. In other words, the transmission shaft 67 terminates at an end wall of the basket 64 and is constrained to the end wall of the basket 64. Specifically, a first primary shaft 66 is arranged on the outside, the transmission shaft 67 is arranged on the inside, and the other (second) primary shaft 66 is arranged between the transmission shaft 67 and the first primary shaft 66. In other words, from the inside outwards, there is the transmission shaft 67 (which is in the centre) and successively the two primary shafts 66 (which are inserted one inside the other and both surround the transmission shaft 67).

According to a preferred embodiment illustrated in the appended figures, the primary shafts 66 and the transmission shaft 67 of the gearbox 7 are coaxial with the shaft 20 of the internal combustion engine 5; that is, the internal combustion engine 5 is aligned with the gearbox 7.

The dual clutch 65 gearbox 7 comprises a single secondary shaft 68 connected to the differential 8 that transmits motion to the rear drive wheels 4; according to an alternative and equivalent embodiment, the dual clutch gearbox 7 comprises two secondary shafts 68 both connected to the differential 8. A pair of axle shafts 69, each of which is integral with a rear drive wheel 4, depart from the differential 8.

The gearbox 7 has seven forward gears indicated by Roman numerals (first gear I, second gear II, third gear III, fourth gear IV, fifth gear V, sixth gear VI and seventh gear VII) and one reverse gear (indicated by the letter R). Each primary shaft 66 and secondary shaft 68 is mechanically coupled to each other by a plurality of gears, each of which defines a respective gear and comprises a primary toothed wheel 70 mounted on the primary shaft 66 and a secondary toothed wheel 71 mounted on the secondary shaft 68. In order for the gearbox 7 to function properly, all the odd gears (first gear I, third gear III, fifth gear V, seventh gear VII) are coupled to the same primary shaft 66, while all the even gears (second gear II, fourth gear IV, and sixth gear VI) are coupled to the other primary shaft 66.

Each primary toothed wheel 70 is splined to a respective primary shaft 66 to always rotate integrally with the primary shaft 66 and permanently meshes with the respective secondary toothed wheel 71; on the other hand, each secondary toothed wheel 71 is mounted idle on the secondary shaft 68. Furthermore, the gearbox 7 comprises four dual synchronisers 72, each of which is coaxially mounted to the secondary shaft 68, is arranged between two secondary toothed wheels 19, and is adapted to be actuated to alternately engage the two respective secondary toothed wheels 19 to the secondary shaft 68 (i.e., to alternately make the two respective secondary toothed wheels 19 angularly integral with the secondary shaft 68). In other words, each synchroniser 72 may be moved in one direction to engage a secondary toothed wheel 71 to the secondary shaft 68, or it may be moved in the other direction to engage the other secondary toothed wheel 71 to the secondary shaft 68.

Figure 13:
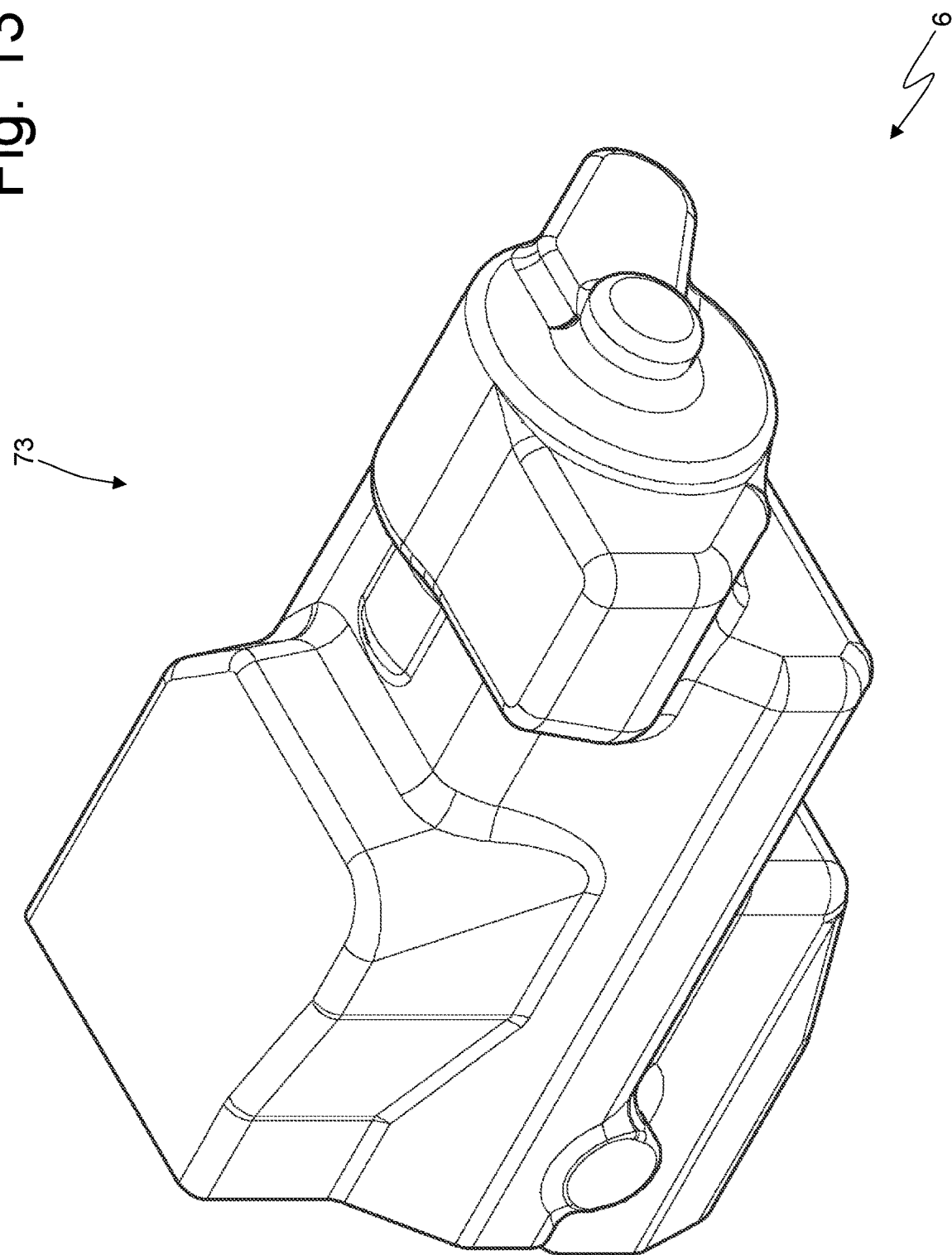
FIGS. 13 and 14 are, respectively, a perspective and side view of a transmission system of the car in FIG. 1.
Figure 14:
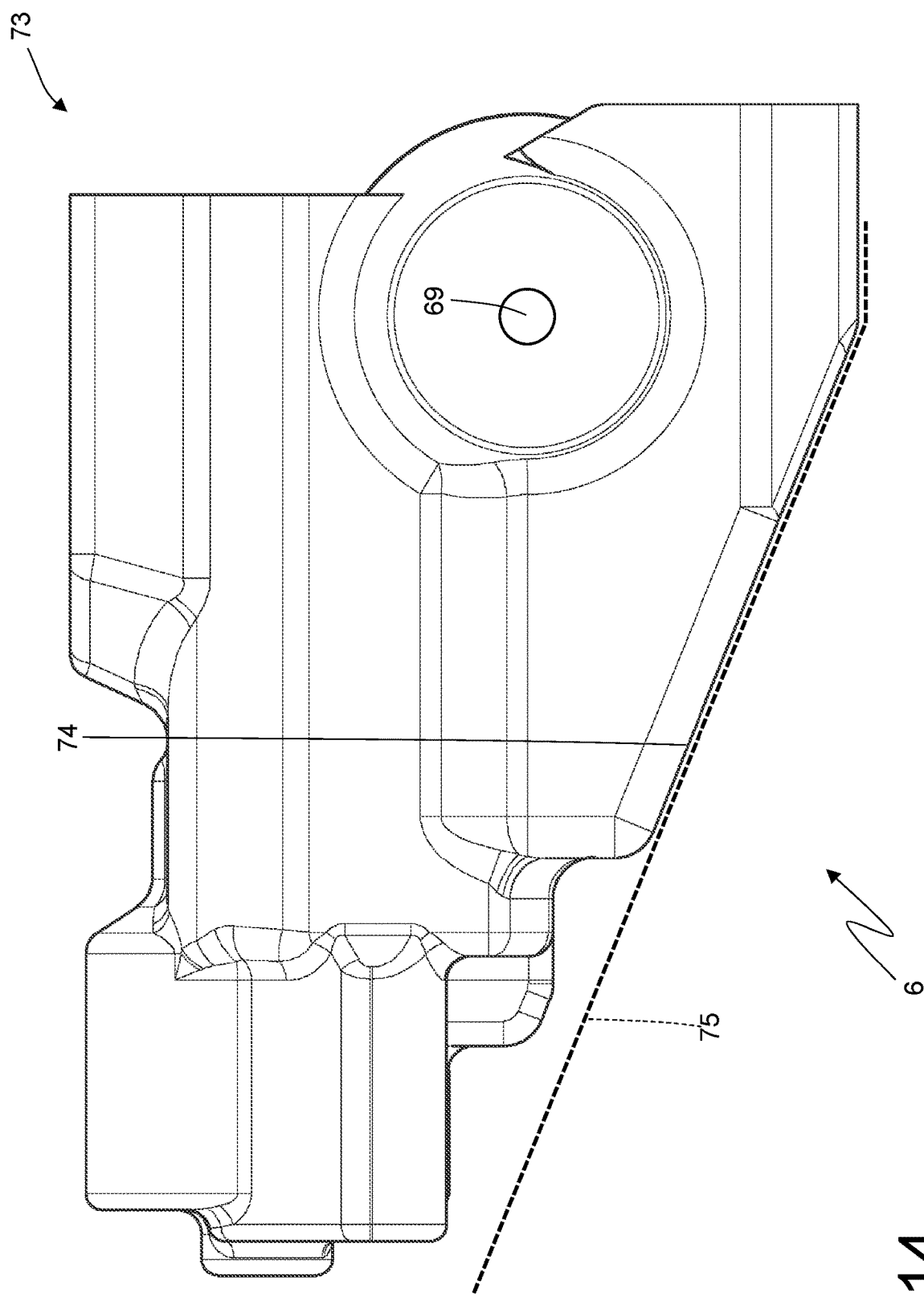

According to what is illustrated in FIGS. 13 and 14, the car 1 comprises a containment body 73 which contains within it (also) the dual clutch gearbox 7 and has a shape tapered towards the rear so that the height of the containment body 73 progressively decreases from the front to the rear. That is, a front wall of the containment body 73 has a greater extension in height than a rear wall of the containment body 73. In particular, the containment body 73 has a back wall 74 at the bottom which is inclined with respect to the horizontal due to the tapered shape of the containment body 73.

The differential 8 (which receives motion from the secondary shaft 68 of the gearbox 7 and transmits motion to the two rear drive wheels 4 via the two respective axle shafts 69) is arranged inside the containment body 73 at the front and below the gearbox 7. The two axle shafts 69 emerge laterally from the containment body 73.

From the foregoing, we can summarise that the gearbox 7 is directly connected to the drive shaft 20 of the internal combustion engine 5, is aligned with the internal combustion engine 5 (i.e., the primary shafts 66 and the transmission shaft 67 of the gearbox 7 are coaxial with the drive shaft of the internal combustion engine 5), and is arranged behind the internal combustion engine 5; furthermore, the intercooler 39 is arranged horizontally above the gearbox 7 (i.e., above the containment body 37 in which the gearbox 7 is located).

Figure 7:
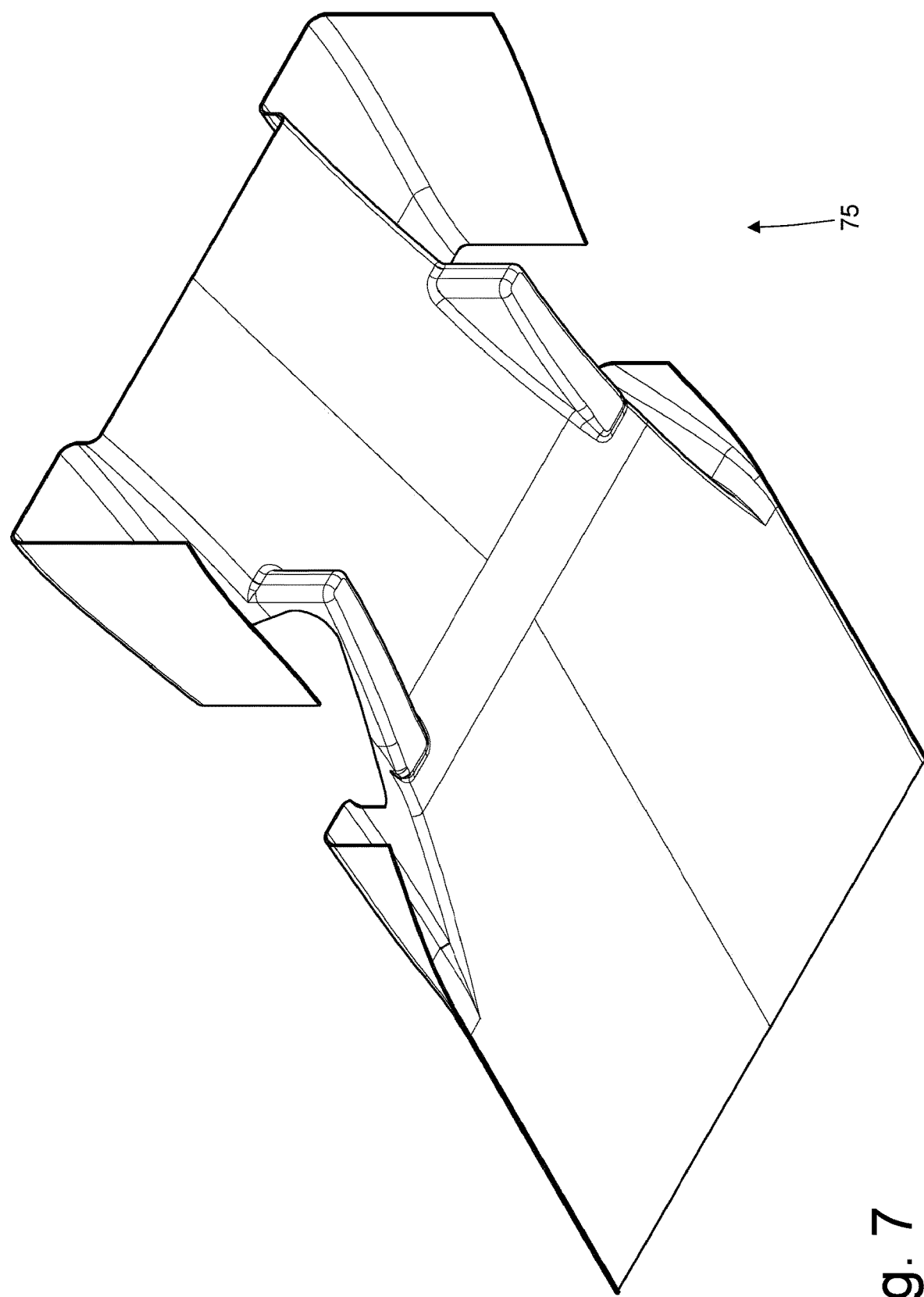
FIGS. 7 and 8 are respectively a perspective and side view of an aerodynamic extractor of the car in FIG. 1.
Figure 8:
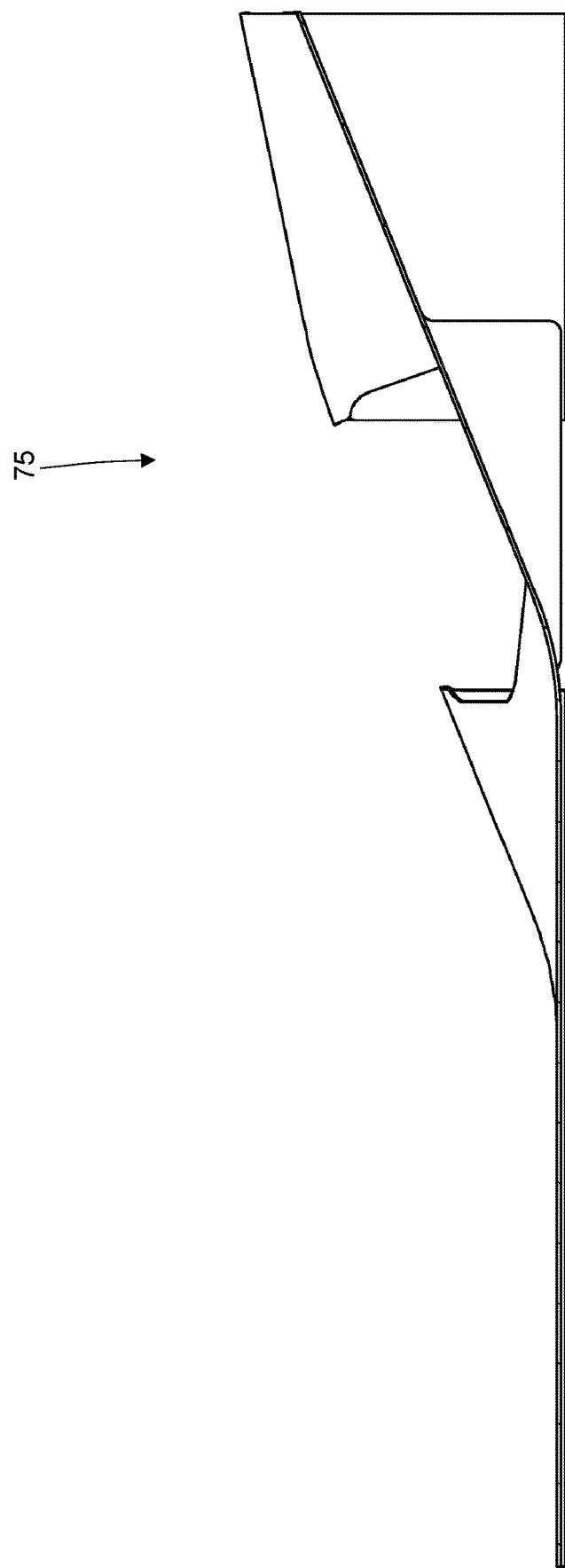
Figure 9:
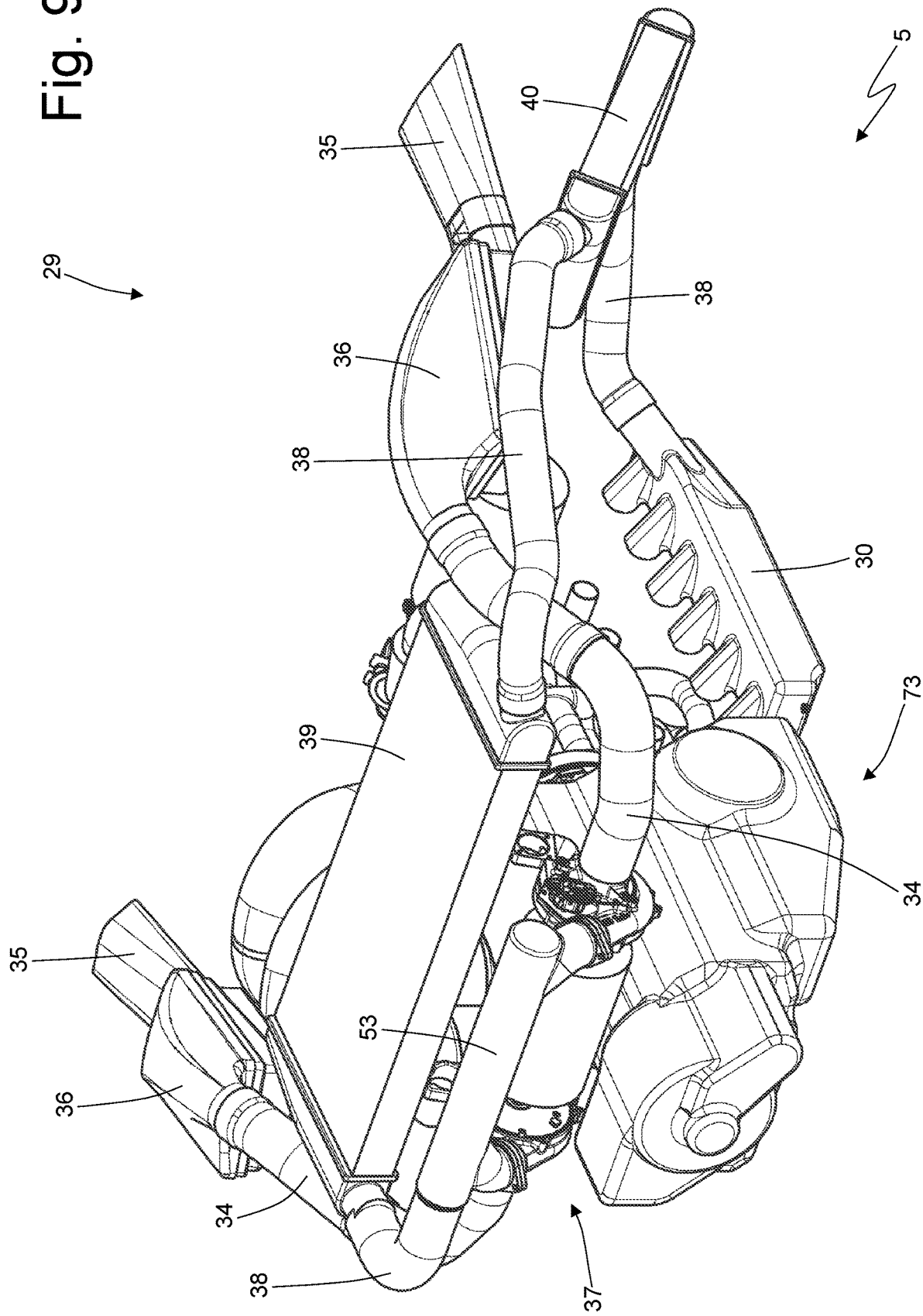
FIGS. 9-12 are respectively two different perspective views, a top view and a rear view of the internal combustion engine.
Figure 10:
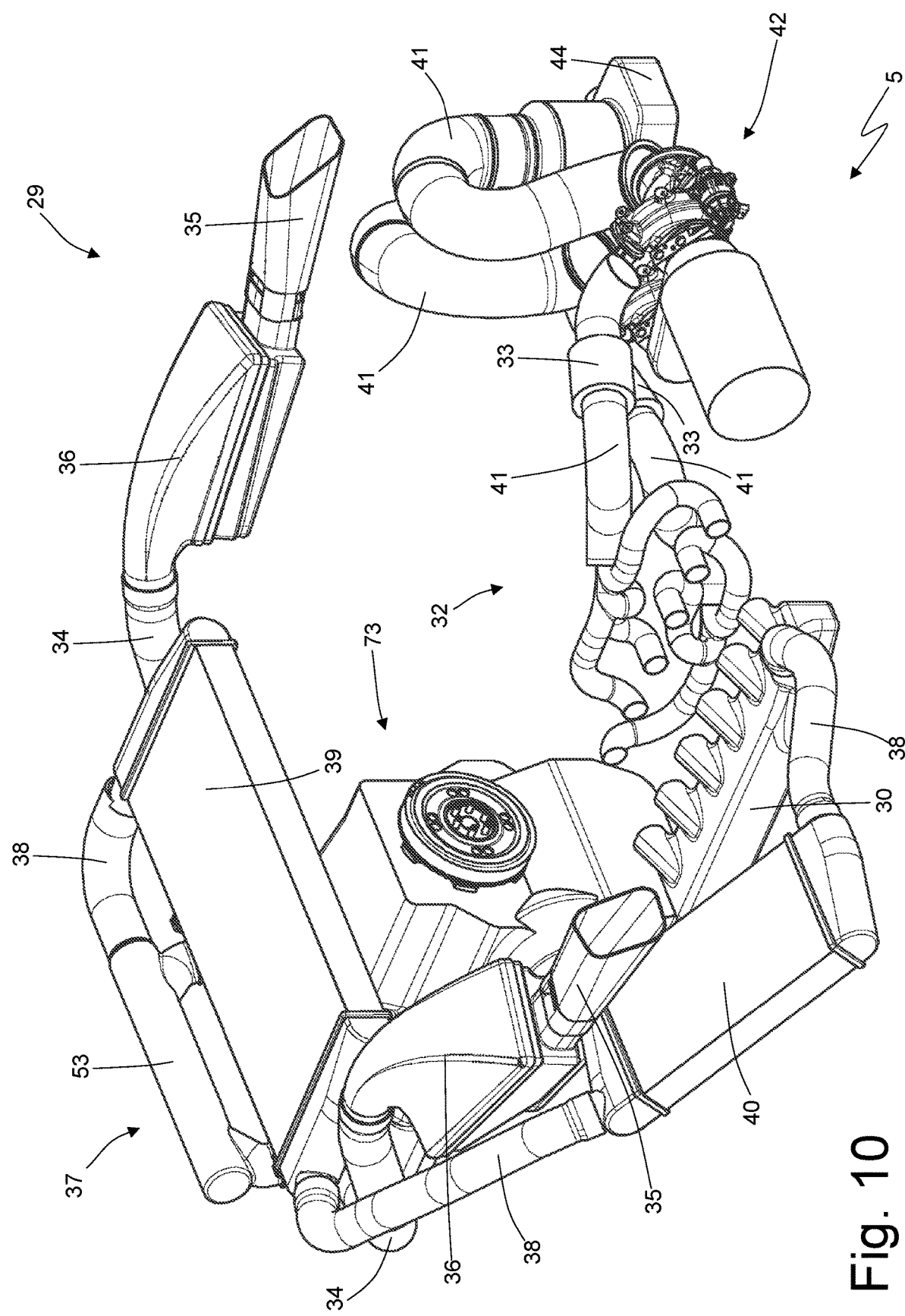

As illustrated in FIGS. 3, 7 and 8, the car 1 comprises a rear aerodynamic extractor 75 which faces the road surface 14, starts at a rear wall of the engine block (comprising the crankcase 17 and the cylinder head 21) of the internal combustion engine 5 and is arranged below the gearbox 7 (i.e. below the containment body 73 in which the gearbox 7 is located).

According to a preferred embodiment, the bottom wall 74 of the containment body 73 (within which the gearbox 7 is located) has the same inclination as the rear aerodynamic extractor 75; that is, the bottom wall 74 of the containment body 73 reproduces the shape of the rear aerodynamic extractor 75 by presenting the same inclination. In this way, the rear aerodynamic extractor 75 exploits all the available space below the gearbox 7 (i.e. below the containment body 73 in which the gearbox 7 is located).

Figure 6:
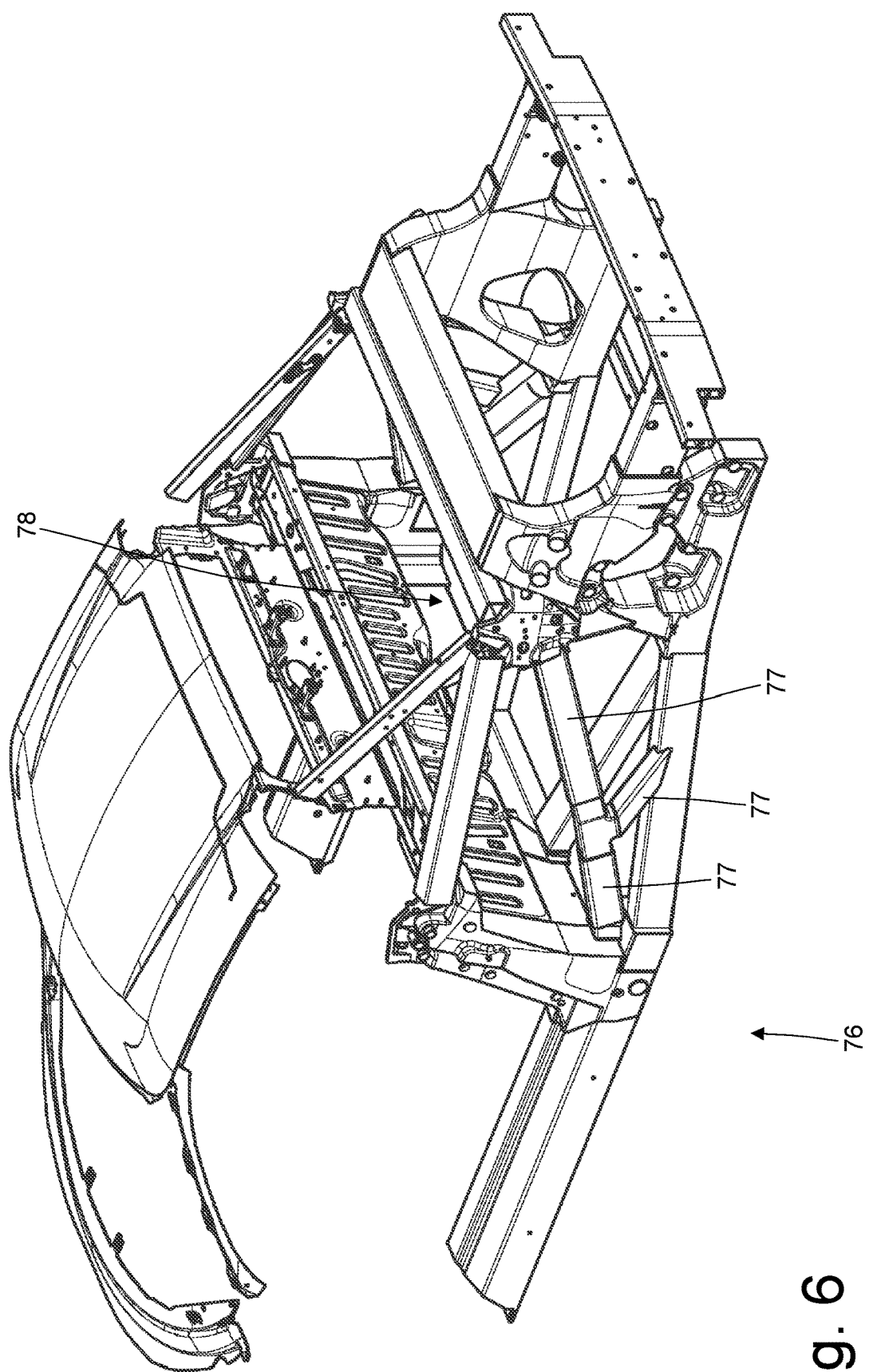
FIG. 6 is a perspective view with parts removed for clarity of a chassis of the car in FIG. 1.

As illustrated in FIG. 6, the car 1 comprises a chassis 76 (partially illustrated in FIG. 6). The rear part of the chassis 76 comprises side bars 77 that are arranged at the spherical tanks 15 to protect the spherical tanks 15 from side impacts; the side bars 77 make tetrahedrons to present greater impact resistance.

As illustrated in FIG. 6, there is an engine compartment 78 inside the chassis 76 in which the internal combustion engine 5 is arranged. As illustrated in FIG. 3, the bottom 14 of the car 1 comprises an opening 79 which is arranged at the engine compartment 78 and a removable panel 80 which is removably fixed and closes the opening 79. The opening 79 has a dimension similar to the dimension of the engine compartment 78; that is, the dimension of the opening 79 is approximately (as far as possible) equal to the dimension of the engine compartment 78 so that through the opening 79 there can be complete access to the engine compartment 78.

According to a preferred embodiment, the removable panel 80 is at least partially transparent; in particular, the removable panel 80 has a transparent window 81 (e.g. glass) in the centre. The function of the transparent window 81 is essentially technical in that it allows the internal combustion engine 5 to be visually inspected without having to remove the removable panel 80.

In accordance with a preferred embodiment, the body 12 has no opening bonnet (arranged above the engine compartment 78) allowing access to the engine compartment 78; that is, access to the engine compartment 78 is only from below through the opening 79 as the upper part of the engine compartment 78 is permanently closed by fixed, non-removable panels of the body 12.

According to a preferred embodiment, the removable panel 80 is directly fixed to the chassis 76 by a plurality of screws 82 (preferably quarter-turn screws 82).

The rear aerodynamic extractor 75 faces the road surface 14, is arranged to the rear of the removable panel 80 and borders onto the removable panel 80. That is, the rear aerodynamic extractor 75 starts where the removable panel 80 ends. The aerodynamic extractor 75 is also detachable to allow easier access to the containment body 73 of the gearbox housing 7.

In the embodiment illustrated in FIGS. 9-12, the turbine unit 42 is provided which generates electrical energy by means of the electric generator 54 and the compressor unit 37 drives the two compressors 49 by means of the electric motor 50, which utilises (at least in part) the electrical energy generated by the electric generator 54 of the turbine unit 42.

In the embodiment illustrated in FIGS. 18-21, there is no turbine unit 42 and the compressor unit 37 is devoid of the electric motor 50 since the two compressors 49 are driven by the gearbox 7 by taking motion from the basket 64 of the clutches 65 of the gearbox 7 (as will be further explained below). In other words, the two compressors 49 are driven by the transmission shaft 67 of the gearbox 7 (which directly rotates the basket 64 of the clutches 65 and is directly connected to the drive shaft 20). This embodiment is energetically somewhat less efficient (not recovering some of the energy from the exhaust gases through the turbine unit 42) but is lighter, more compact and simpler by eliminating the electrical part altogether (in fact, neither the electric generator 54 of the turbine unit 42 nor the electric motor 50 of the compressor unit 37 are present).

As illustrated in FIGS. 22-26, there is an actuation system 83 which connects the basket 64 of the gearbox 7 to the compressor unit 37 (i.e. to the two compressors 49 of the compressor unit 37) so as to take motion from the basket 64 of the gearbox 7 to bring the two compressors 49 of the compressor unit 37 into rotation. By way of example, the actuation system 83 increases the rotation speed in such a way that the two compressors 49 of the compressor unit 37 always rotate faster than the basket 64 of the gearbox 7; for example, the two compressors 49 of the compressor unit 37 could rotate 7-8 times faster than the basket 64 of the gearbox 7.

As illustrated in FIG. 15, the actuation system 83 is connected to an end wall of the basket 64 of the gearbox 7 on the opposite side of the transmission shaft 67; that is, the basket 64 of the gearbox 7 has an end wall which is connected to the transmission shaft 67 on one side and is connected to the actuation system 83 on the opposite side.

Figure 24:
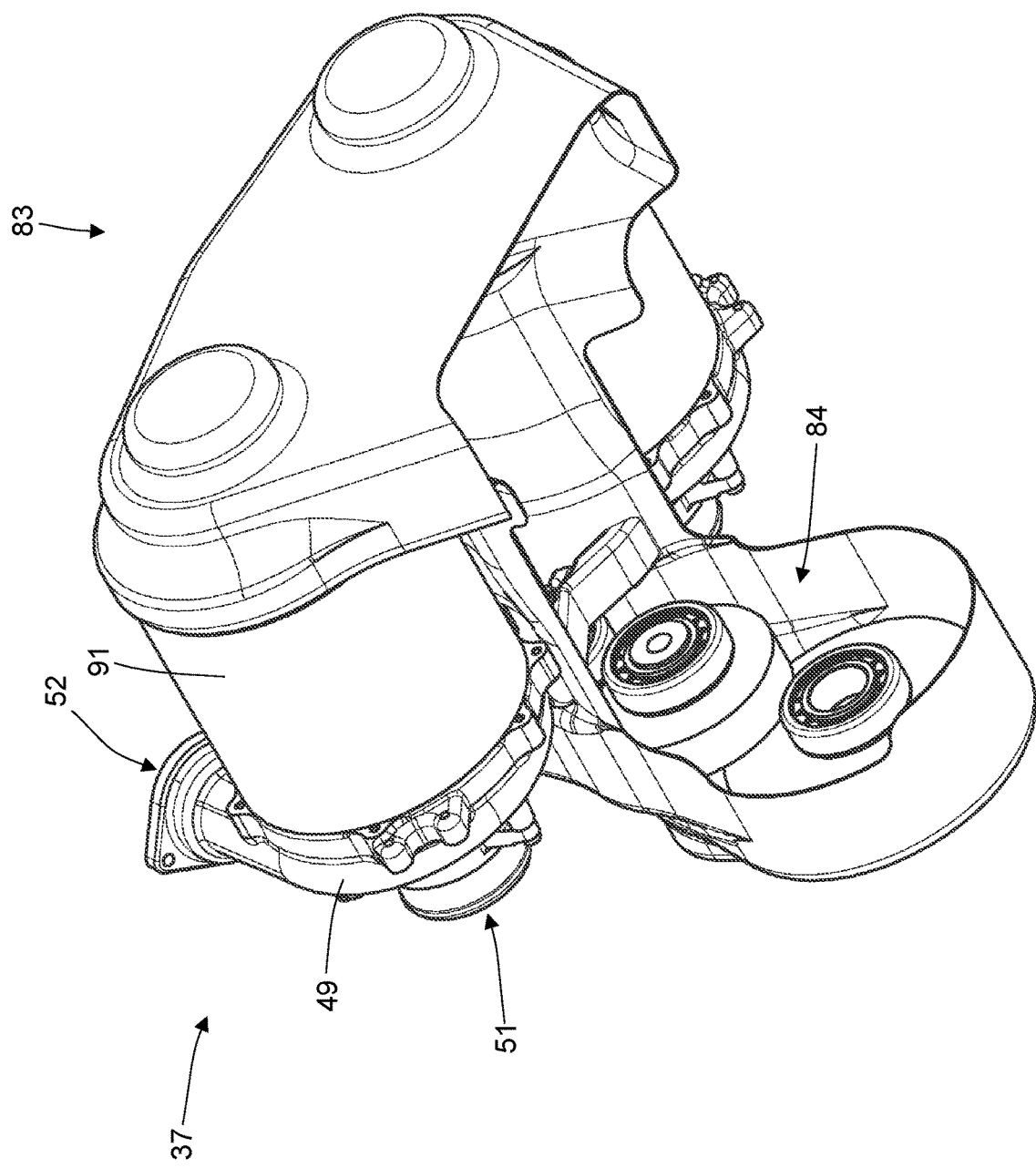
FIGS. 24 and 25 are two different perspective views of the compressor unit in FIGS. 22 and 23 and a corresponding actuation system.

According to a possible embodiment schematically illustrated in FIG. 24, the actuation system 83 comprises a variator device 84 which is interposed between the basket 64 of the gearbox 7 and the compressors 49 and has a variable gear ratio. Preferably, the variator device 84 has a centrifugal activation so as to autonomously change the gear ratio according to the rotation speed of the basket 64 of the gearbox 7; in particular, the variator device 84 is configured to decrease the gear ratio as the rotation speed of the basket 64 of the gearbox 7 increases. That is, when the rotational speed of the basket 64 of gearbox 7 is slower, the gear ratio is larger and therefore (for the same rotational speed of the basket 64) the compressors 49 run faster, whereas when the rotational speed of the basket 64 of gearbox 7 is higher, the gear ratio is smaller and therefore (for the same rotational speed of the basket 64) the compressors 49 run slower; in this way, the compressors 49 are able to generate effective compression even when the gearbox basket 64 is rotating slowly without "going out of rotation" when the gearbox basket 64 is rotating fast.

According to a preferred embodiment, the variator device 84 has only two different gear ratios; by way of example, the two gear ratios obtainable via the variator device 84 could differ from each other by 30-40%.

According to a preferred embodiment, the variator device 84 comprises a direct drive engaged by a centrifugal clutch and a planetary gear that realises a lower gear ratio from the direct drive: the centrifugal clutch is actuated by the centrifugal force that compresses the clutch discs by engaging the direct drive when the rotation speed of the basket 64 of gearbox 7 exceeds a threshold value (thus resulting in a reduction of the gear ratio when the rotation speed of the basket 64 of gearbox 7 exceeds the threshold value). According to a preferred embodiment, a gear ratio of the variator device 84 could correspond to a direct drive (i.e. a 1:1 gear ratio) while the other gear ratio could be comprised between 1:1.3 and 1:1.4.

According to a preferred embodiment, the variator device 84 is connected to the basket 64 of the gearbox 7 on the opposite side of the primary shafts 66 and the transmission shaft 67.

In the embodiment illustrated in FIGS. 22-26, the two compressors 49 are arranged parallel to each other and spaced apart so as to rotate about two axes 85 of rotation which are parallel to each other and spaced apart and are parallel to an axis 86 of rotation of the basket 64 of the gearbox 7 (which is coaxial to the primary shafts 66, the transmission shaft 67, and the drive shaft 20). In particular, the axis 86 of rotation of the basket 64 of the gearbox 7 is arranged between the axes 85 of rotation of the two compressors 49; that is, the two compressors 49 are arranged on opposite sides of the axis 86 of rotation of the basket 64 of the gearbox 7.

Figure 26:
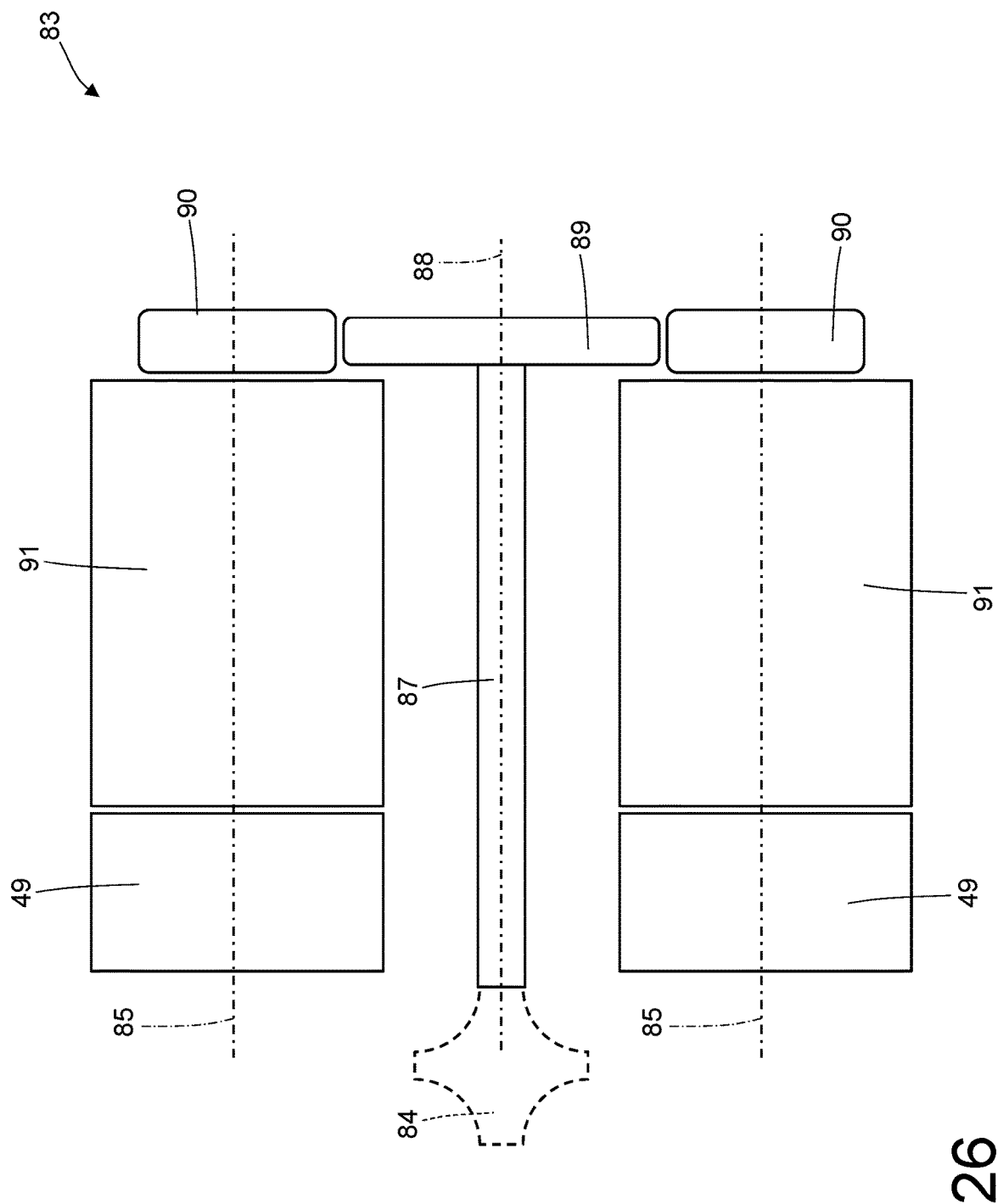
FIG. 26 is a schematic view of part of the actuation system in FIGS. 24 and 25.

According to a preferred embodiment illustrated in FIG. 26, the actuation system 83 comprises an intermediate shaft 87 that receives motion from the basket 64 of the gearbox 7 and rotates about an axis 88 of rotation that is parallel to and spaced apart from the axis 86 of rotation of the basket 64 of the gearbox 7. Specifically, between the basket 64 of the gearbox 7 and the intermediate shaft 87 is the variator device 84. The actuation system 83 comprises a central toothed wheel 89 which receives motion from the intermediate shaft 87 (i.e. is constrained to the intermediate shaft 87) and two lateral toothed wheels 90 which are arranged on either side of the central toothed wheel 89, engage with the central toothed wheel 89 and each transmit motion to a corresponding compressor 49 (i.e. each lateral toothed wheel 90 is constrained to a shaft of a corresponding compressor 49). A transmission 91 is interposed between each lateral toothed wheel 90 and the corresponding compressor 49, which increases the rotation speed so that the compressor 49 can rotate faster than the lateral toothed wheel 90.

Overall, the compressors 49 rotate much faster than the drive shaft 20 (i.e. the basket 64 of the gearbox 7): the compressors 49 rotate around ten times faster than the drive shaft 20 (i.e. the compressors 49 can reach 100,000 rpm while the drive shaft 20 can reach 10,000 rpm).

Figure 22:
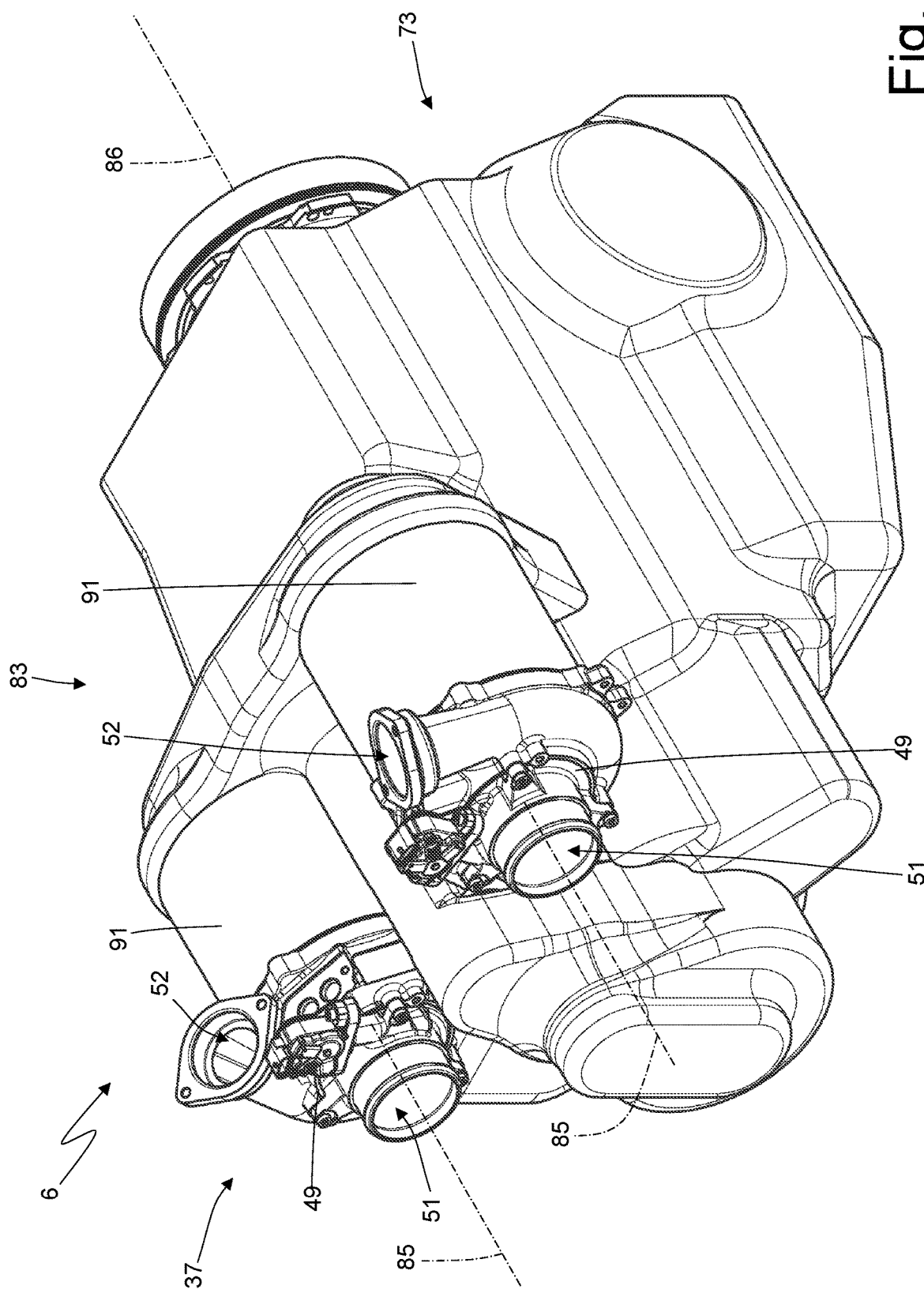
FIGS. 22 and 23 are, respectively, a perspective view and a rear view of a transmission system and a compressor unit coupled to the internal combustion engine in FIGS. 18-21.
Figure 23:
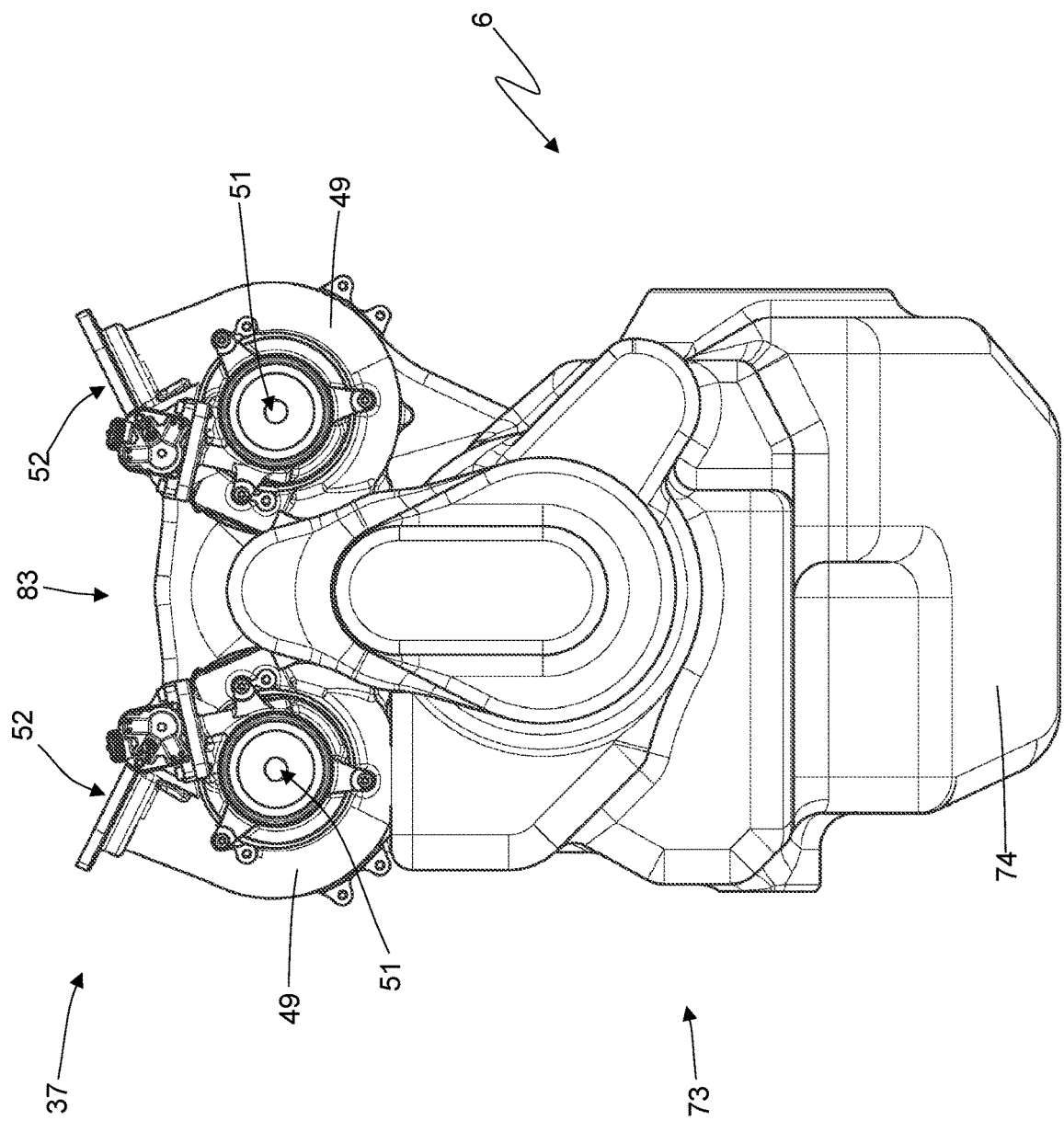
Figure 25:
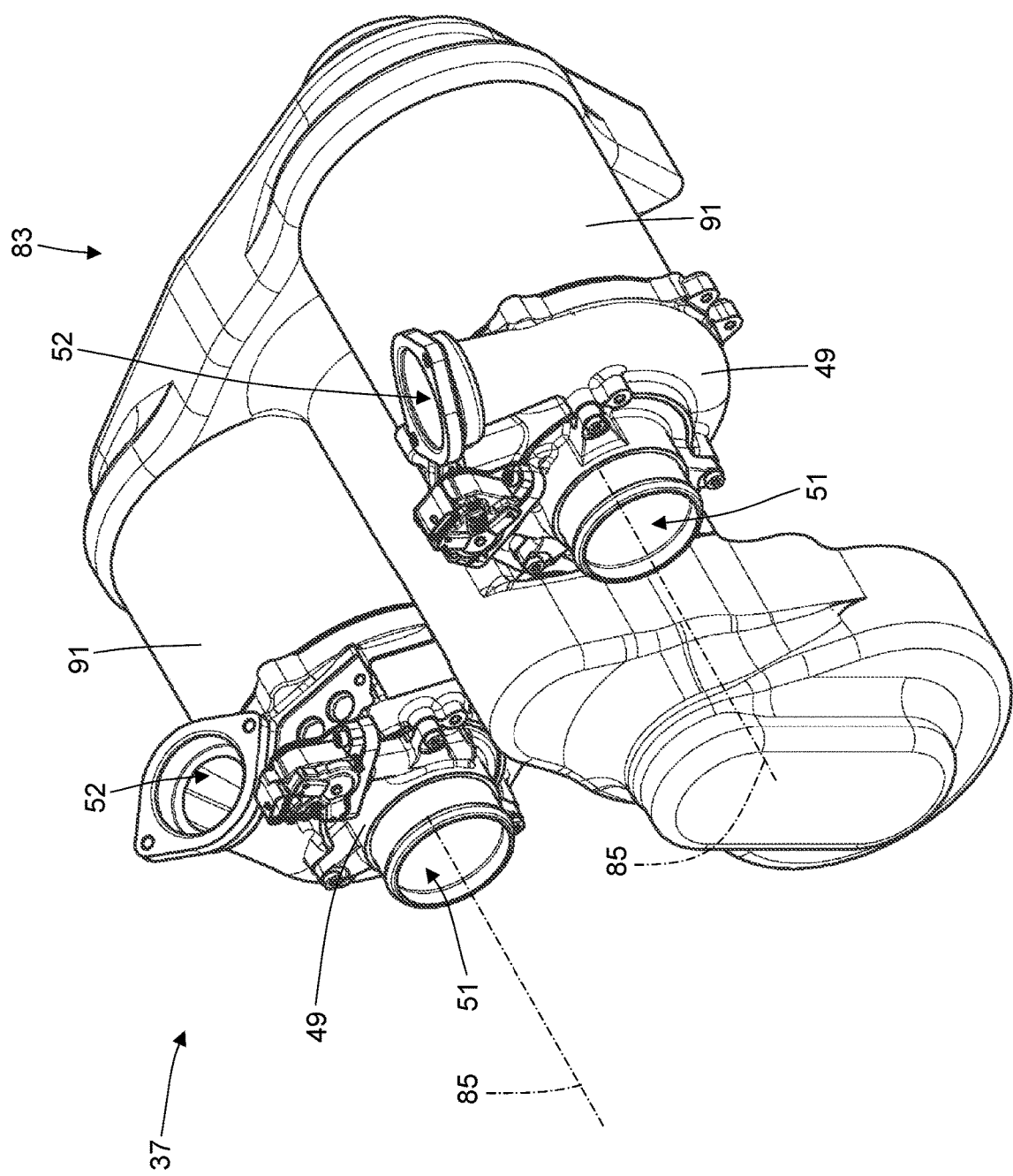

As illustrated in FIGS. 22 and 25, each compressor 49 comprises an axial inlet 51 arranged on the opposite side of the actuation system 83 and a radial outlet 52. As described above, there is a connecting duct 53 (not shown in FIGS. 22-25) which is connected to both outlets 52 of the two compressors 49 to receive and join the compressed air from both compressors 49.

In the embodiment illustrated in FIGS. 9-12, there are two exhaust ducts 41 which originate from the cylinders 18 and terminate in the silencer 44 and are completely separate and independent from the cylinders 18 to the silencer 44. In contrast, in the embodiment illustrated in FIGS. 18-21, there is an exhaust duct 92, into which both exhaust ducts 41 flow and terminates in the silencer 44; that is, the exhaust ducts 41 flow together upstream of the silencer 44, flowing together into the exhaust duct 92, which terminates in the silencer 44. In other words, the exhaust system 32 comprises a single exhaust duct 92 that receives exhaust gases from both exhaust ducts 41; i.e. the two exhaust ducts 41 merge to converge towards the single exhaust duct 92. The exhaust duct 92 starts at the junction of the two exhaust ducts 41 and ends in the silencer 44.

In the embodiment illustrated in the appended figures, the compressor unit 37 comprises two twin compressors 49; according to a different embodiment not illustrated, the compressor unit 37 comprises a single compressor 49.

In the embodiment illustrated in the appended figures, the turbine unit 42 (when present) comprises two twin turbines 43; in a different embodiment not illustrated, the turbine unit 42 (when present) comprises a single turbine 43.

The embodiments described herein can be combined with one another without departing from the scope of protection of the present invention.

The car 1 as described above has many advantages.

Firstly, the car 1 described above combines a large hydrogen storage capacity (thus being able to offer a satisfactory range) with very high dynamic performance thanks to optimal wheelbase, overall weight, and weight distribution. These results are achieved thanks to the special conformation and arrangement of the internal combustion engine 5 and the transmission system 6, which allow a large amount of free space to accommodate the hydrogen tanks 9 and 10 without penalising the dynamic performance of the car 1.

The car 1 as described above allows the construction of an extremely large rear aerodynamic chute (extractor), thus enabling the generation of a very high aerodynamic load without any penalisation of aerodynamic drag.

In the car 1 described above, it is possible to hear inside the passenger compartment 15 (particularly in the driver's station 16 where the driver sits) an exhaust noise with a sufficiently high intensity and a very good sound quality; this result is obtained thanks to the fact that the outlet opening is very close to the passenger compartment 15 and on the side of the driver's station 16, as this solution allows both to "concentrate" the sound intensity near the passenger compartment 15 and to have a very natural exhaust noise (i.e. not created or in any case artificially modified). That is to say, the exhaust noise is not artificially "aimed" towards the passenger compartment 15 through non-natural transmission channels, but, on the contrary, the exhaust noise only reaches the passenger compartment 15 by passing through the exhaust system, i.e. by following the natural exit route of the exhaust noise.

In the car 1 described above, thanks in part to the special design of the dual clutch gearbox 7 in which the basket 64 is arranged on the opposite side of the internal combustion engine, it is possible to achieve a particularly favourable (i.e. compact while being very functional) positioning of all the powertrain elements in order to minimize the length of the wheelbase (i.e. the distance between the front and rear axles).

In the car 1 described above, thanks in part to the particular conformation of the compressor unit 37 in which the twin compressors 49 are arranged coaxially on opposite sides of the electric motor 50, it is possible to obtain a particularly favourable arrangement of all the elements of the powertrain system (i.e. compact while being very functional); at the same time, the presence of twin compressors 49 allows particularly high air flow rates to be compressed.

In the car 1 described above, also thanks to the particular conformation of the turbine unit 42 in which the two twin turbines 42 are arranged side by side to drive a common electric generator 54, it is possible to obtain a particularly favourable arrangement of all the elements of the powertrain system (i.e. compact while being very functional); at the same time the presence of two twin turbines 42 allows a high amount of energy to be recovered from the exhaust gas.

In the car 1 described above (in particular in the embodiment illustrated in FIGS. 18-26), the geometry of the intake ducts 34 and 38 is optimal in terms of both overall dimensions and pressure drop without having to resort to electric actuation of the compressor unit 37; this result is obtained by taking the motion necessary to bring the two compressors 49 of the compressor unit 37 into rotation directly from the basket 64 of the dual-clutch gearbox 7, which is in a very favourable position for positioning the compressor unit 37.

In the car 1 described above, the particular design and positioning of the two intercoolers 39 and 40 make it possible to maximize the effectiveness and efficiency of the cooling of the compressed air without requiring too severe constraints on the location of all the other components of the internal combustion engine 5.

In the car 1 as described above, the aerodynamic extractor 75 is very large (thus allowing high downforce to be generated with a modest increase in drag) even though the internal combustion engine 5 is located in a central/rear position (thus having an optimal distribution of masses between the front and rear axle) and, at the same time, the wheelbase is relatively short (i.e. the car 1 exhibits extremely high-performance dynamic behaviour). This is achieved by placing the internal combustion engine 5 with the drive shaft 20 higher up. This also allows the gearbox 7 to be placed higher up, thus freeing up space in the lower part of the rear of the car to accommodate the very large aerodynamic extractor 75.

In the car 1 described above, accessibility to all areas of the internal combustion engine 5 is excellent and complete; this is achieved thanks to the accessibility from below which, once the car 1 has been lifted, always allows a worker to stand exactly below the component to be worked on. That is, accessibility from below to the internal combustion engine 5 makes maintenance easy and simple, since workers are not restricted by the shape of car 1, but can easily move around all areas of the internal combustion engine 5 as the car 1 is raised.

In the car 1 described above, the fact that the removable panel is at least partially transparent constitutes not only an undoubted technical advantage as explained above, but also an aesthetic innovation and makes the removable panel also an aesthetic element; it is important to note that thanks to the large aerodynamic extractor 75 it is relatively easy to see through the transparent part of the removable panel at least part of the internal combustion engine 5 without having to bend down excessively.

In the car 1 described above, the body 12 is particularly rigid and strong due to the complete absence of an opening for access to the engine compartment 78 (and normally closed by a bonnet). Thus, for the same rigidity, the overall mass of the body 12 can be reduced. In addition, the absence of an opening for access to the engine compartment 78 also makes the body 12 completely continuous (i.e. without interruptions), thus reducing the aerodynamic penetration coefficient. The possibility of eliminating through the body 12 an opening for access to the engine compartment 78 is due to the fact that the internal combustion engine 5 does not require any maintenance in the upper part (consisting of the crankcase 17) and consequently it is no longer necessary to access the engine compartment 78 from above. In fact, all the main components of the internal combustion engine 5 are located in the lower part of the engine compartment 78 and are easily accessible from the bottom 14 through the opening 79 closed by the removable panel 80.

In the car 1 described above, the lubrication pumps 60 and 61 and the cooling pump 63 are optimally placed to minimize the number of components required to drive the pumps 60, 61 and 63 in rotation and, at the same time, keep the pressure drops in the lubrication circuit 59 and the cooling circuit 62 low. That is, the simultaneous grouping and actuation via the two camshafts 23 and 26 of the four pumps 60, 61 and 63 makes the solution cheaper, lighter and more compact than known solutions currently on the market.

LIST OF REFERENCE NUMBERS OF THE FIGURES 1 car
2 front wheels
3 electric machine
4 rear wheels
5 internal combustion engine
6 transmission system
7 gearbox
8 rear differential
9 passenger compartment
10 driving station
11 steering wheel
12 body
13 doors
14 bottom
15 tank
16 tank
17 crankcase
18 cylinders
19 pistons
20 drive shaft
21 cylinder head
22 intake valves
23 camshaft
24 belt drive
25 exhaust valves
26 camshaft
27 fuel injector
28 spark plug
29 intake system
30 intake manifold
31 throttle valve
32 exhaust system
33 treatment device
34 intake ducts
35 air inlet
36 air filter
37 compressor unit
38 intake duct
39 intercooler
40 intercooler
41 exhaust ducts
42 turbine unit
43 turbines
44 silencer
45 end pipe
46 outlet opening
47 shaft
48 rotation axis
49 compressor
50 electric motor
51 axial inlet
52 radial outlet
53 connecting duct
54 electric generator
55 axes of rotation
56 transmission device
57 radial inlet
58 axial outlet
59 lubrication circuit
60 lubrication pump
61 lubrication pump
62 cooling circuit
63 cooling pump
64 basket 65 clutches
66 primary shafts
67 transmission shaft
68 secondary shaft
69 axle shafts
70 primary toothed wheel
71 secondary toothed wheel
72 synchronizers
73 containment body
74 back wall
75 aerodynamic extractor
76 chassis
77 sidebars
78 engine compartment
79 opening
80 removable panel
81 transparent window
82 screws
83 actuation system
84 variator device
85 axes of rotation
86 axis of rotation
87 intermediate shaft
88 axis of rotation
89 central toothed wheel
90 lateral toothed wheels
91 transmission
92 exhaust duct

The invention claimed is:

1. A car (1) comprising:
two front wheels (2);
two rear drive wheels (4);
a passenger compartment (9) which is arranged between the two front wheels (2) and the two rear drive wheels (4);
an internal combustion engine (5), which is powered by hydrogen, is provided with a plurality of cylinders (18), inside which respective pistons (19) slide, and with a drive shaft (20) connected to the pistons (19), and is longitudinally arranged behind the passenger compartment (9);
a transmission system (6), which connects the drive shaft (20) of the internal combustion engine (5) to the rear drive wheels (4);
at least two first tanks (15), which are arranged beside an engine block of the internal combustion engine (5), at least a first of the at least two first tanks (15) arranged on one side of the engine block and at least a second of the at least two first tanks (15) arranged on an opposite side of the engine block, the at least two first tanks (15) configured to contain hydrogen; and
at least one second tank (16), which is configured to contain hydrogen and is arranged above the internal combustion engine (5).

2. The car (1) according to claim 1, wherein each first tank (15) has a spherical shape.

3. The car (1) according to claim 1, wherein the at least one second tank (16) comprises two second tanks (16) arranged above the internal combustion engine (5) in front of one another.

4. The car (1) according to claim 1, wherein the at least one second tank (16) has a cylindrical shape.

5. The car (1) according to claim 4, wherein the at least one second tank (16) is oriented transversally.

6. The car (1) according to claim 1, wherein the internal combustion engine (5) is vertically oriented with the drive shaft (20) arranged higher than the cylinders (18).

7. The car (1) according to claim 6, wherein the internal combustion engine (5) comprises a crankcase (17), in which the cylinders (18) are obtained, which are open downwards, and a cylinder head (21), which makes up the crown of the cylinders (18) and is arranged below the crankcase (17).

8. The car (1) according to claim 1, wherein the transmission system (6) comprises a gearbox (7), which is directly connected to the drive shaft (20) of the internal combustion engine (5), is aligned with the internal combustion engine (5) and is arranged behind the internal combustion engine (5).

9. The car (1) according to claim 8, wherein the gearbox (7) comprises at least one primary shaft (66), which is coaxial to the drive shaft (20) of the internal combustion engine (5).

10. The car (1) according to claim 8 and comprising a rear aerodynamic extractor (75), which faces a road surface (14) and is arranged below the gearbox (7).

11. The car (1) according to claim 1, wherein the internal combustion engine (5) comprises at least one exhaust duct (41), which originates from the cylinders (18) and ends in a silencer (44), which is arranged on a side of the car (1) beside the engine block of the internal combustion engine (5) and in front of a rear drive wheel (4).

12. The car (1) according to claim 11, wherein the silencer (44) has an exhaust duct end pipe (45), which leads to at least one outlet opening (46) obtained through the side of the car (1) or through a bottom (14) of the car (1).

13. The car (1) according to claim 1, wherein the internal combustion engine (5) comprises:
two first intake ducts (34), which are independent of and separate from one another;
two compressors (49), each coupled to a corresponding first intake duct (34);
one single second intake duct (38), which originates from the two compressors (49) and ends in an intake manifold (30) of the internal combustion engine (5); and
a first intercooler (39) arranged along the second intake duct (38).

14. The car (1) according to claim 13, wherein:
the two compressors (49) are arranged at the back behind the first intercooler (39);
the internal combustion engine (5) comprises a second intercooler (40) which is arranged along the second intake duct (38) and in series with the first intercooler (39);
the first intercooler (39) is arranged above the engine block of the internal combustion engine (5); and
the second intercooler (40) is arranged on a side of the car (1) beside the engine block of the internal combustion engine (5) and in front of one of the two rear drive wheels (4).

15. A car (1) comprising:
two front wheels (2);
two rear drive wheels (4);
a passenger compartment (9) which is arranged between the two front wheels (2) and the two rear drive wheels (4);
an internal combustion engine (5), which is powered by hydrogen, is provided with a plurality of cylinders (18), inside which respective pistons (19) slide, and with a drive shaft (20) connected to the pistons (19), and is longitudinally arranged behind the passenger compartment (9);
a transmission system (6), which connects the drive shaft (20) of the internal combustion engine (5) to the rear drive wheels (4); and at least two first tanks (15), which are arranged beside an engine block of the internal combustion engine (5), at least a first of the at least two first tanks (15) arranged on one side of the engine block and at least a second of the at least two first tanks (15) arranged on an opposite side of the engine block, the at least two first tanks (15) configured to contain hydrogen;

wherein the internal combustion engine (5) is vertically oriented with the drive shaft (20) arranged higher than the cylinders (18).

16. The car (1) according to claim 15, wherein the internal combustion engine (5) comprises a crankcase (17), in which the cylinders (18) are obtained, which are open downwards, and a cylinder head (21), which makes up the crown of the cylinders (18) and is arranged below the crankcase (17).

17. A car (1) comprising:
two front wheels (2);
two rear drive wheels (4);
a passenger compartment (9) which is arranged between the two front wheels (2) and the two rear drive wheels (4);
an internal combustion engine (5), which is powered by hydrogen, is provided with a plurality of cylinders (18), inside which respective pistons (19) slide, and with a drive shaft (20) connected to the pistons (19), and is longitudinally arranged behind the passenger compartment (9);
a transmission system (6), which connects the drive shaft (20) of the internal combustion engine (5) to the rear drive wheels (4); and
at least two first tanks (15), which are arranged beside an engine block of the internal combustion engine (5), at least a first of the at least two first tanks (15) arranged on one side of the engine block and at least a second of the at least two first tanks (15) arranged on an opposite side of the engine block, the at least two first tanks (15) configured to contain hydrogen;
wherein the transmission system (6) comprises a gearbox (7), which is directly connected to the drive shaft (20) of the internal combustion engine (5), is aligned with the internal combustion engine (5) and is arranged behind the internal combustion engine (5).

18. The car (1) according to claim 17, wherein the gearbox (7) comprises at least one primary shaft (66), which is coaxial to the drive shaft (20) of the internal combustion engine (5).

19. The car (1) according to claim 17 and comprising a rear aerodynamic extractor (75), which faces a road surface (14) and is arranged below the gearbox (7).

20. A car (1) comprising:
two front wheels (2);
two rear drive wheels (4);
a passenger compartment (9) which is arranged between the two front wheels (2) and the two rear drive wheels (4);
an internal combustion engine (5), which is powered by hydrogen, is provided with a plurality of cylinders (18), inside which respective pistons (19) slide, and with a drive shaft (20) connected to the pistons (19), and is longitudinally arranged behind the passenger compartment (9);
a transmission system (6), which connects the drive shaft (20) of the internal combustion engine (5) to the rear drive wheels (4); and
at least two first tanks (15), which are arranged beside an engine block of the internal combustion engine (5), at least a first of the at least two first tanks (15) arranged on one side of the engine block and at least a second of the at least two first tanks (15) arranged on an opposite side of the engine block, the at least two first tanks (15) configured to contain hydrogen;
wherein the internal combustion engine (5) comprises at least one exhaust duct (41), which originates from the cylinders (18) and ends in a silencer (44), which is arranged on a side of the car (1) beside the engine block of the internal combustion engine (5) and in front of a rear drive wheel (4).

21. The car (1) according to claim 20, wherein the silencer (44) has an exhaust duct end pipe (45), which leads to at least one outlet opening (46) obtained through the side of the car (1) or through a bottom (14) of the car (1).

\* \* \* \* \*